US011892787B2

(12) United States Patent
Izawa et al.

(10) Patent No.: US 11,892,787 B2
(45) Date of Patent: Feb. 6, 2024

(54) FIXING DEVICE FOR REDUCING BELT DAMAGE

(71) Applicant: HEWLETT-PACKARD DEVELOPMENT COMPANY, L.P., Spring, TX (US)

(72) Inventors: Tatsunori Izawa, Yokohama (JP); Takayuki Horie, Yokohama (JP); Yasuo Suzuki, Yokohama (JP); Satoru Furuya, Yokohama (JP); Satoshi Ohwada, Yokohama (JP); Hiroyuki Sato, Yokohama (JP); Koichi Utsunomiya, Yokohama (JP)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/918,221

(22) PCT Filed: May 18, 2021

(86) PCT No.: PCT/US2021/032917
§ 371 (c)(1),
(2) Date: Oct. 11, 2022

(87) PCT Pub. No.: WO2021/242569
PCT Pub. Date: Dec. 2, 2021

(65) Prior Publication Data

US 2023/0195014 A1 Jun. 22, 2023

(30) Foreign Application Priority Data

May 29, 2020 (JP) ................................ 2020-094461

(51) Int. Cl.
*G03G 15/20* (2006.01)

(52) U.S. Cl.
CPC ..... *G03G 15/2053* (2013.01); *G03G 15/2064* (2013.01); *G03G 2215/00143* (2013.01);
(Continued)

(58) Field of Classification Search
CPC .......... G03G 15/2053; G03G 15/2064; G03G 15/1615; G03G 2215/00151;
(Continued)

(56) References Cited

U.S. PATENT DOCUMENTS 2,925,168 A * 2/1960 Lorig .................. B65G 39/071 198/493
5,257,078 A * 10/1993 Kuroda .............. G03G 15/2064 399/329
(Continued)

FOREIGN PATENT DOCUMENTS

JP 2005-156581 A 6/2005
JP 2007-212579 A 8/2007
(Continued)

*Primary Examiner* — Robert B Beatty
(74) *Attorney, Agent, or Firm* — Foley & Lardner LLP

(57) ABSTRACT

A fixing device includes a belt having a tubular shape and extending in a longitudinal direction, and having a longitudinal end, a drive roller to rotate the belt to convey a print medium between the drive roller and the belt, a bushing located at the longitudinal end of the belt, and a guide wall adjacent to the bushing. The belt is displaceable in the longitudinal direction relative to the bushing. The bushing includes a shoulder adjacent to the longitudinal end of the belt and a stem extending from the shoulder to an inside of the belt to support the belt. The guide guides the bushing to move in a direction opposite to a conveyance direction of the print medium when the belt moves toward the bushing. The stem of the bushing includes a convex portion that is in contact with an inner surface of the belt when the belt is displaced in the longitudinal direction.

9 Claims, 25 Drawing Sheets

(52) U.S. Cl.
CPC ............. *G03G 2215/00151* (2013.01); *G03G 2215/2035* (2013.01); *G03G 2215/2038* (2013.01)

(58) Field of Classification Search
CPC ... G03G 2215/2038; G03G 2215/1623; G03G 2215/2032; G03G 2215/2035; G03G 2215/00143; B65G 39/071; B65G 39/16
USPC ............... 399/165, 302, 303, 308, 313, 329; 198/840; 474/111, 122, 124
See application file for complete search history.

(56) References Cited

U.S. PATENT DOCUMENTS

| | | | | |
|---|---|---|---|---|
| 8,792,812 | B2 * | 7/2014 | Fujioka | G03G 15/755 474/122 |
| 2006/0233575 | A1 | 10/2006 | Uchida et al. | |
| 2012/0308279 | A1 * | 12/2012 | Tanaka | G03G 15/2053 399/329 |
| 2012/0315064 | A1 * | 12/2012 | Takifuji | G03G 15/1615 399/121 |
| 2013/0322943 | A1 | 12/2013 | Iwakoshi et al. | |
| 2013/0325842 | A1 | 12/2013 | Asai et al. | |
| 2014/0183008 | A1 * | 7/2014 | Yasumoto | B41J 11/007 198/813 |
| 2014/0301760 | A1 * | 10/2014 | Nanjo | G03G 15/2053 399/329 |
| 2015/0232281 | A1 * | 8/2015 | Heitplatz | B65G 15/28 198/835 |
| 2016/0139553 | A1 * | 5/2016 | Hozumi | G03G 15/6529 399/388 |
| 2018/0239281 | A1 | 8/2018 | Ohta et al. | |
| 2019/0025737 | A1 | 1/2019 | Lee et al. | |

FOREIGN PATENT DOCUMENTS

| | | | |
|---|---|---|---|
| JP | 2009-168944 | A | 7/2009 |
| JP | 2009-192726 | A | 8/2009 |
| JP | 2015-028527 | A | 2/2015 |
| JP | 2015-069124 | A | 4/2015 |
| JP | 2015-105979 | A | 6/2015 |
| JP | 6143900 | B2 | 6/2017 |
| KR | 10-2008-0003542 | A | 1/2008 |

* cited by examiner

FIXING DEVICE FOR REDUCING BELT DAMAGE

BACKGROUND

An imaging system includes, for example, a conveyance device that conveys a sheet, an image carrier on which an electrostatic latent image is to be formed, a developing device that develops the electrostatic latent image, a transfer device that secondarily transfers a toner image onto the sheet, a fixing device that fixes the toner image to the sheet, and an output device that outputs the sheet.

DETAILED DESCRIPTION

In the following description, with reference to the drawings, the same reference numbers are assigned to the same components or to similar components having the same function, and overlapping description is omitted.

Figure 1:
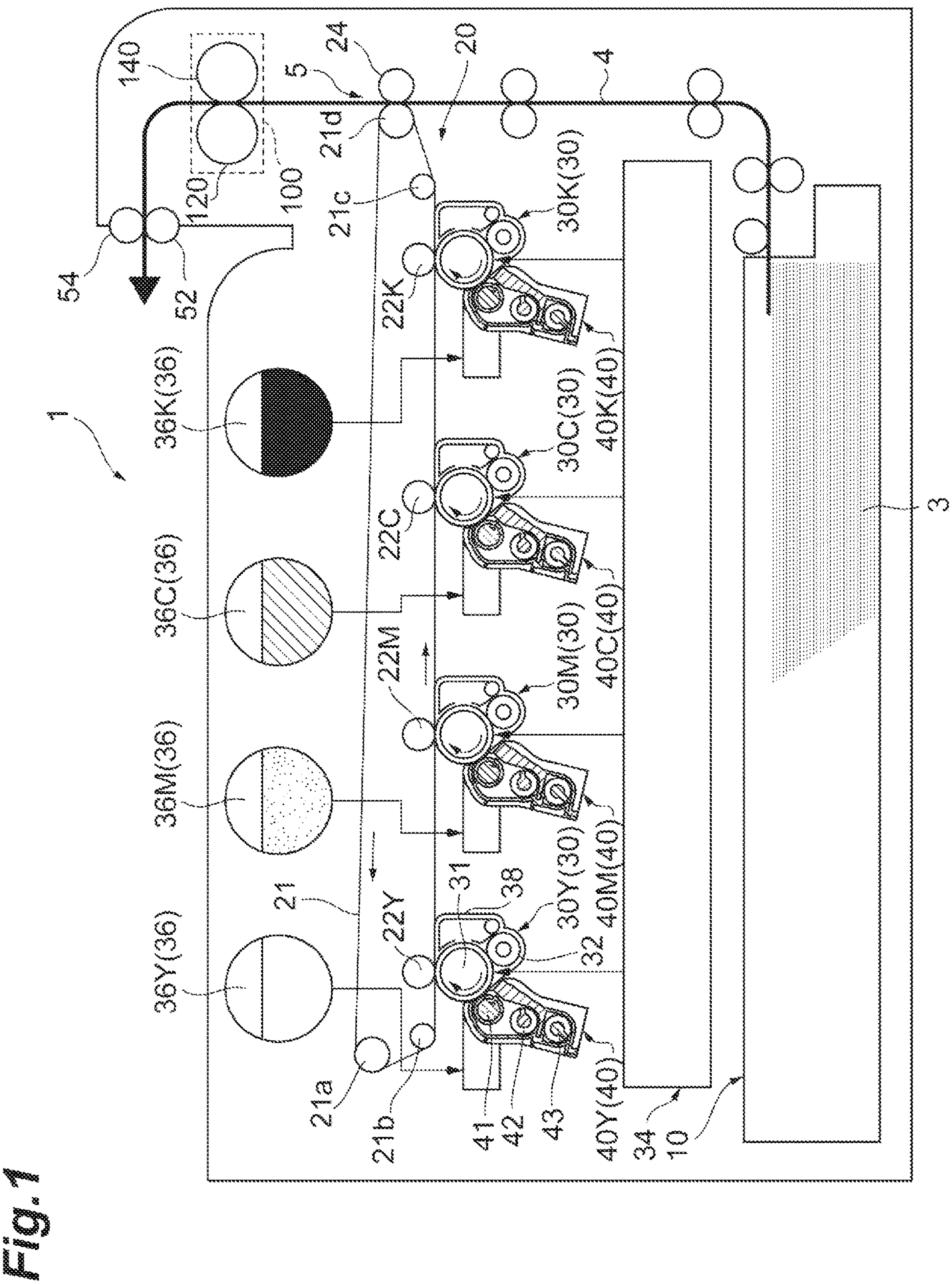
FIG. 1 is a schematic view illustrating a configuration of an example imaging apparatus.

With reference to FIG. 1, an example imaging apparatus 1 uses yellow, magenta, cyan, and black colors of toner to form a color image. The imaging apparatus 1 includes, for example, a conveyance unit (conveyance device) 10 that conveys a sheet 3 which is a print medium, a transfer unit (or transfer device) 20 that transfers a developed toner image onto the sheet 3, a photoconductor unit (or photoconductor device) 30 having a surface (peripheral surface) to form an electrostatic latent image, a developing unit (or developing device) 40 that develops the electrostatic latent image with the toner, and a fixing device 100 that fixes the toner to the sheet 3. The photoconductor device 30 may include photoconductor devices 30Y, 30M, 30C, and 30K that correspond to yellow, magenta, cyan, and black colors, respectively. In addition, the developing device 40 may include developing devices 40Y, 40M, 40C, and 40K that correspond to yellow, magenta, cyan, and black colors, respectively.

The conveyance device 10 contains the sheet 3 on which an image is to be formed. In addition, the conveyance device 10 conveys the sheet 3 onto a conveyance path 4. The sheets 3 are stacked inside a cassette. The conveyance device 10 conveys the sheet 3 to reach a secondary transfer region 5 when the toner image conveyed by the transfer device 20 reaches the secondary transfer region 5.

The transfer device 20 conveys the toner images, which are formed by the respective photoconductor devices 30Y, 30M, 30C, and 30K and which are layered to form a single composite toner image, to the secondary transfer region 5. The transfer device 20 includes, for example, a transfer belt 21, a drive roller 21*d*, a tension roller 21*a*, guide rollers 21*b* and 21*c*, primary transfer rollers 22Y, 22M, 22C, and 22K, and a secondary transfer roller 24. The transfer belt 21 is suspended around the drive roller 21*d*, the tension roller 21*a*, and the guide rollers 21*b* and 21*c*. The transfer belt 21 is an endless belt that is driven by the drive roller 21*d*, to rotate. The primary transfer rollers 22Y, 22M, 22C, and 22K are provided on an inner peripheral side of the transfer belt 21 along a movement direction of the transfer belt 21. The secondary transfer roller 24 is provided to press the drive roller 21*d* from an outer peripheral side of the transfer belt 21 at the secondary transfer region 5, so as to transfer the composite toner image from the transfer belt 21 to the sheet 3. In addition, the transfer device 20 may include a belt cleaning device or the like that removes residual toner remaining on the transfer belt 21, after the composite toner image has been transferred to the sheet 3.

The photoconductor device 30 includes a photoconductor drum 31, a charging roller 32, an exposure unit (or exposure device) 34, and a cleaning unit (cleaning device) 38. The photoconductor drum 31 has a peripheral surface forming an electrostatic latent image carrier to form an image. The photoconductor drum 31 may be, for example, an organic photoconductor (OPC). Each of the photoconductor devices

30Y, 30M, 30C, and 30K include the same components so as to form respective toner images with the respective colors of toner. The photoconductor drums 31 of the photoconductor devices 30Y, 30M, 30C, and 30K are provided along the movement direction of the transfer belt 21, and face the primary transfer rollers 22Y, 22M, 22C, and 22K, so as to interpose the transfer belt 21 therebetween, in order to transfer the toner images to the transfer belt 21. As illustrated in FIG. 1, the charging roller 32 and the cleaning device 38 are provided around the photoconductor drum 31.

The charging roller 32 uniformly charges the surface of the photoconductor drum 31 to a predetermined potential. The exposure device 34 exposes the surface of the photoconductor drum 31 to light, the surface being charged by the charging roller 32, according to an image (electrostatic latent image) to be formed. The exposure device 34 in one example irradiates the surface of the photoconductor drum 31 with a laser light to change the potential of a portion of the surface of the photoconductor drum 31 that is exposed to the light. The change in potential forms the electrostatic latent image on the surface of the photoconductor drum 31.

The cleaning device 38 recovers toner that remains on the photoconductor drum 31 after the toner image on the photoconductor drum 31 is primarily transferred onto the transfer belt 21. The cleaning device 38 may be configured to cause a cleaning blade to come into contact with the peripheral surface of the photoconductor drum 31 to remove the toner remaining on the photoconductor drum 31. A charge eliminating lamp that resets the potential of the photoconductor drum 31 may be disposed on the periphery of the photoconductor drum 31 between the cleaning device 38 and the charging roller 32 in a rotational direction of the photoconductor drum 31.

Toner is supplied to four developing devices 40 from four toner tanks 36 corresponding to the four developing devices 40. The toner tank 36 includes toner tanks 36Y, 36M, 36C, and 36K that correspond to yellow, magenta, cyan, and black colors, respectively. The four toner tanks 36Y, 36M, 36C, and 36K are respectively filled with, for example, a first replenishment developer in which yellow toner and a carrier are mixed, a second replenishment developer in which magenta toner and a carrier are mixed, a third replenishment developer in which cyan toner and a carrier are mixed, and a fourth replenishment developer in which black toner and a carrier are mixed. The developing devices 40Y, 40M, 40C, and 40K develop the electrostatic latent images formed on the respective photoconductor drums 31 with the toner from the respective toner tanks 36Y, 36M, 36C, and 36K. The electrostatic latent image is developed, thereby generating the toner images on the photoconductor drums 31.

Each of the developing devices 40Y, 40M, 40C, and 40K may include, for example, a developing roller 41, a supply auger 42, and a stirring auger 43. The developing roller 41 is a developer carrier that supplies toner to the electrostatic latent image formed on the peripheral surface of the photoconductor drum 31. The developing roller 41 receives the developer from the supply auger 42 due to magnetic force to convey the developer to the photoconductor drum 31.

The supply auger 42 and the stirring auger 43 stir the magnetic carrier and the non-magnetic toner forming the developer, to tribocharge the carrier and the toner. The stirring auger 43 conveys the charged developer to the supply auger 42. The supply auger 42 supplies the mixed and stirred developer to the developing roller 41. Each of the supply auger 42 and the stirring auger 43 has a helical conveyance surface disposed along a longitudinal direction (direction orthogonal to the view of FIG. 1).

The fixing device 100 fixes the toner image, which is secondarily transferred onto the sheet 3 from the transfer belt 21, to the sheet 3. The fixing device 100 includes, for example, a heating belt 120 and a drive roller 140. The heating belt 120 is, for example, a member that has a tubular shape and is rotatable around the rotational axis thereof. For example, a heat source such as a halogen lamp may be provided inside the heating belt 120. The drive roller 140 is, for example, a cylindrical member that is rotatable around the rotational axis thereof. The drive roller 140 is provided to press the heating belt 120. A heat-resistant elastic layer made of, for example, silicone rubber or the like is provided on outer peripheral surfaces of the heating belt 120 and the drive roller 140. The sheet 3 is caused to pass through a fixing nip portion that is a contact region between the heating belt 120 and the drive roller 140, so that the toner image is fused and fixed to the sheet 3.

In addition, the imaging apparatus 1 may be provided with output rollers 52 and 54 that output the sheet 3, to which the toner image is fixed by the fixing device 100, outside the apparatus.

A fixing device for an imaging apparatus will be described, according to various examples.

Figure 2:
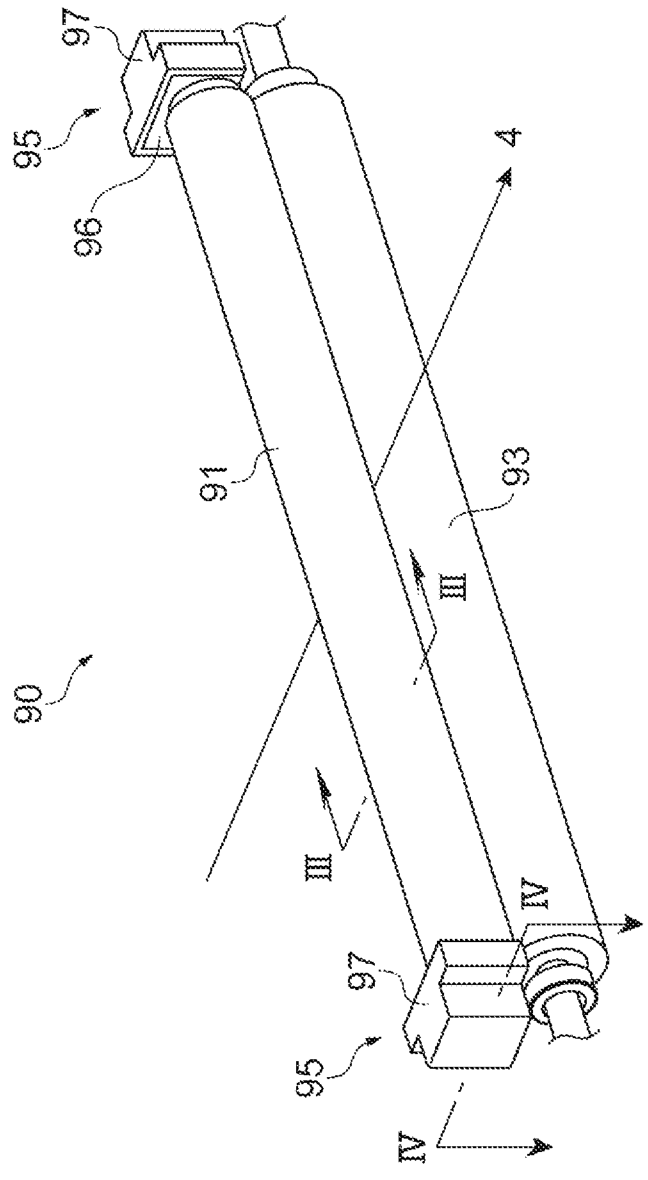
FIG. 2 is a perspective view illustrating a fixing device according to one example.
Figure 3:
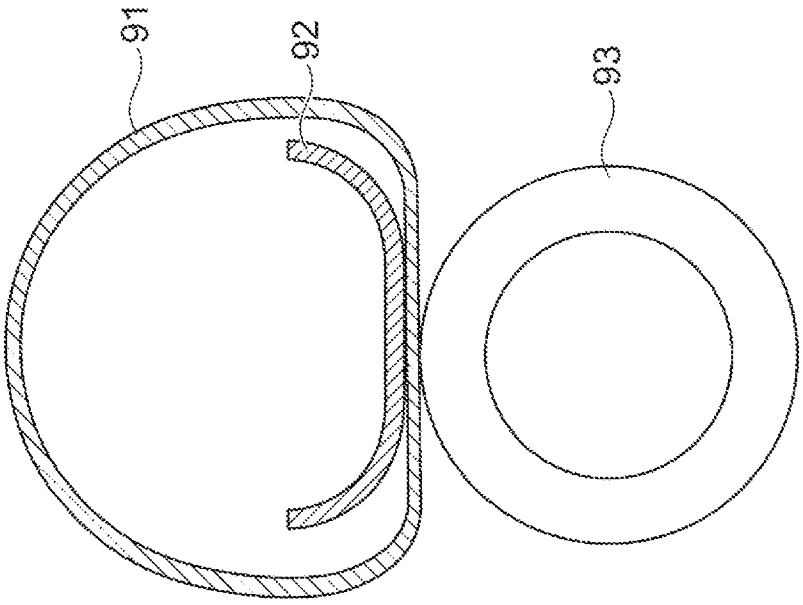
FIG. 3 is a schematic cross-sectional view of the fixing device illustrated in FIG. 2, taken along line III-III.

A fixing device 90 illustrated in FIG. 2 may replace the fixing device 100 in FIG. 1. The fixing device 90 includes a heating belt 91 having flexibility, a drive roller 93, and a support device 95. The heating belt 91 is a belt that has a tubular shape and is rotatable around the rotational axis thereof, and extends in a longitudinal direction that is a rotational axis direction. For example, a heat source such as a halogen lamp is provided inside the heating belt 91. In addition, a plate 92 is disposed inside the heating belt 91, as illustrated in FIG. 3. The plate 92 is slidable relative to an inner peripheral surface of the heating belt 91. For example, the plate 92 has a substantially U-shaped cross section, and a surface of the plate 92 toward the drive roller 93 is formed flat.

As illustrated in FIG. 3, the drive roller 93 is disposed adjacent to the heating belt 91 so as to be parallel to the heating belt 91. The drive roller 93 is rotated around the rotational axis thereof by a motor or the like, and drives the heating belt 91 to rotate. The sheet 3 is conveyed through a nip region to be formed between the drive roller 93 and the heating belt 91 along the conveyance path 4.

Figure 4:
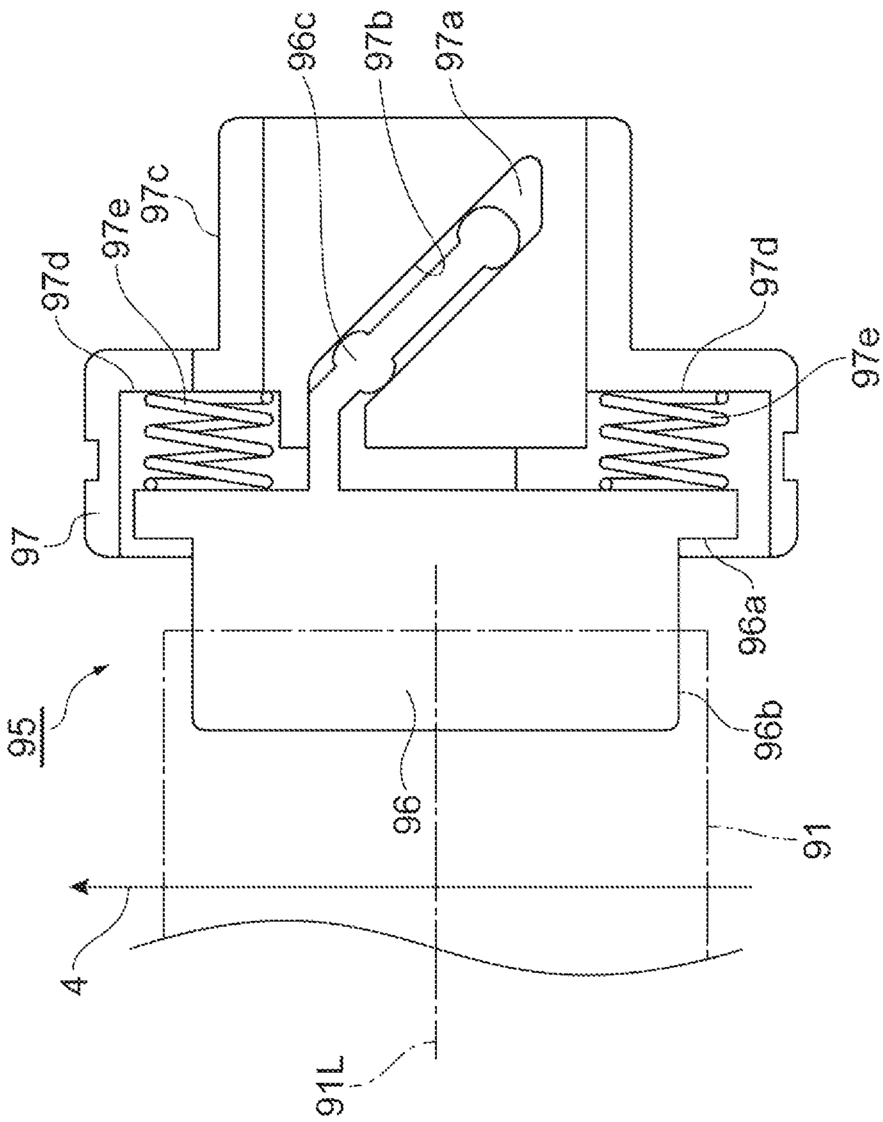
FIG. 4 is a schematic cross-sectional view of the fixing device illustrated in FIG. 2, taken along line IV-IV.

The support device 95 rotatably supports the heating belt 91. As illustrated in FIG. 4, the support device 95 includes a bushing 96 and a holding member 97. The bushing 96 is located at a longitudinal end of the heating belt 91. The bushing 96 includes a shoulder 96*a* having a plate shape, a stem 96*b* protruding from one surface of the shoulder 96*a*, and a protrusion portion 96*c* protruding from the other surface of the shoulder 96*a*. The stem 96*b* has, for example, a cylindrical shape and extends to the inside of the heating belt 91. In addition, in the illustrated example, the protrusion portion 96*c* extends in an oblique direction relative to the longitudinal direction of the heating belt 91, away from the shoulder and toward an upstream side in a conveyance direction along the conveyance path 4.

The holding member 97 holds the protrusion portion 96*c* of the bushing 96. For example, the holding member 97 has a guide groove 97*a* that slidably supports the protrusion portion 96*c* of the bushing 96. The guide groove 97*a* has a guide wall 97*b* that extends substantially in the oblique direction relative to the longitudinal direction of the heating belt 91 to conform with the protrusion portion 96*c*. In addition, the holding member 97 includes a wall portion 97*d* protruding outward on an outer periphery of a main body portion 97*c* in which the guide groove 97*a* is to be formed. The wall portion 97*d* faces the shoulder 96*a* of the bushing 96. A pair of springs (biasing members) 97*e* are disposed between the wall portion 97*d* and the shoulder 96*a*. The bushing 96 is pressed toward a heating belt 91 side by the biasing force that is applied from the springs 97*e* to the shoulder 96*a*. One of the springs 97*e* is disposed on the upstream side of the conveyance direction of the sheet 3, and the other of the springs 97*e* is disposed on a downstream side of the conveyance direction of the sheet 3. The heating belt 91 is rotatably supported on the bushings 96 of the support devices 95 disposed at both ends in the longitudinal direction.

As in the illustrated example, in a case where the heating belt 91 having flexibility is rotatably supported, during rotation of the heating belt 91, the heating belt 91 may move along a rotational axis 91L direction. For example, in a case where the heating belt 91 is supported on a pair of support members such as the bushings 96, the support members have restriction portions such as the shoulders 96*a*, that limit a movement of the heating belt 91 in the direction of the rotational axis 91L. Namely, the heating belt 91 comes into contact with the restriction portion, which stops the movement of the heating belt 91. However, in a case where the heating belt 91 is formed thin, for example due to an increase in operation speed or to a reduction in size of the imaging apparatus, when the heating belt 91 contacts the restriction portion for a relative long duration, an axial end portion of the heating belt 91 is likely to be worn out.

Figure 5:
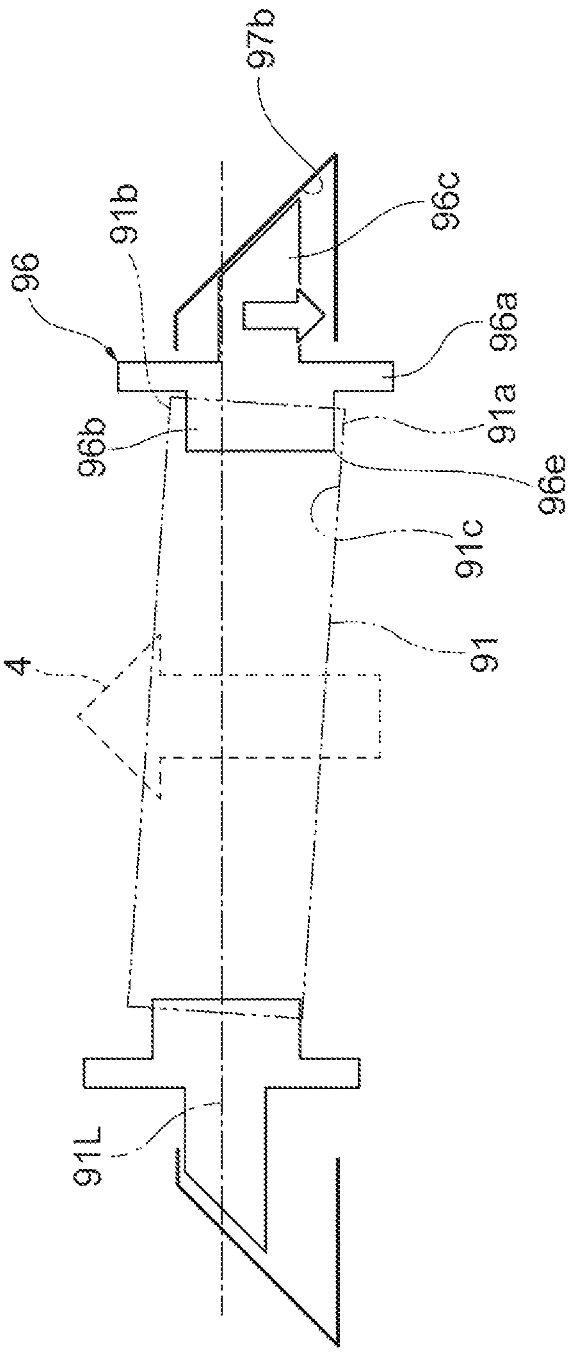
FIG. 5 is a schematic cross-sectional view illustrating the fixing device of FIG. 2 in operation.

Therefore, in the above-described fixing device 90 illustrated in FIGS. 2 to 5, the holding member 97 having the guide wall 97*b* holds the protrusion portion 96*c* of the bushing 96. In such a configuration, when the heating belt 91 moves in the rotational axis 91L direction to come into contact with the shoulder 96*a*, the bushing 96 pressed against the heating belt 91 moves along the guide wall 97*b* toward the upstream side that is a direction opposite to the conveyance direction in the conveyance path 4, as illustrated in FIG. 5. In this case, an end portion 91*a* on a movement direction side of the heating belt 91 (e.g., the end portion 91*a* corresponding to the direction of the longitudinal movement of the heating belt 91), is pressed by the stem 96*b* of the bushing 96 moving toward the upstream side. As described above, the force toward the upstream side is applied to the end portion 91*a* on the movement direction side in the heating belt 91, thereby changing the alignment of the heating belt 91 relative to the drive roller 93. Consequently, the heating belt 91 moves in a direction away from the shoulder 96*a*, so as to correct the posture (or alignment) of the heating belt 91. Consequently, the duration of contact between the heating belt 91 and the shoulder 96*a* is reduced, so as to reduce damage to the heating belt 91 caused by contact with the shoulder 96*a*.

However, since the end portion 91*a* on the movement direction side in the heating belt 91 is shifted toward the upstream side, there occurs a deviation in angle between the rotational axis direction of the heating belt 91 and a protruding direction of the stem. In this case, on the downstream side of the conveyance direction, an end portion 91*b* of the heating belt 91 is pressed against the shoulder 96*a*, and on the upstream side of the conveyance direction, an inner peripheral surface 91*c* of the heating belt 91 is impacted by a corner edge 96*e* on a distal end of the stem 96*b*. Since both of the areas of the heating belt 91 that contact the shoulder 96*a* and the corner edge 96*e* of the stem 96*b* are small in size, any damage to the heating belt 91 tends to increase.

Therefore, a fixing device accordingly one example is configured to avoid the simultaneous occurrence of one end of the heating belt contacting the support device supporting the heating belt, and of an inner surface of the heating belt being pressed against the corner edge of the support device in a radial direction of the heating belt when the heating belt is shifted toward one end side in the longitudinal direction.

Figure 6:
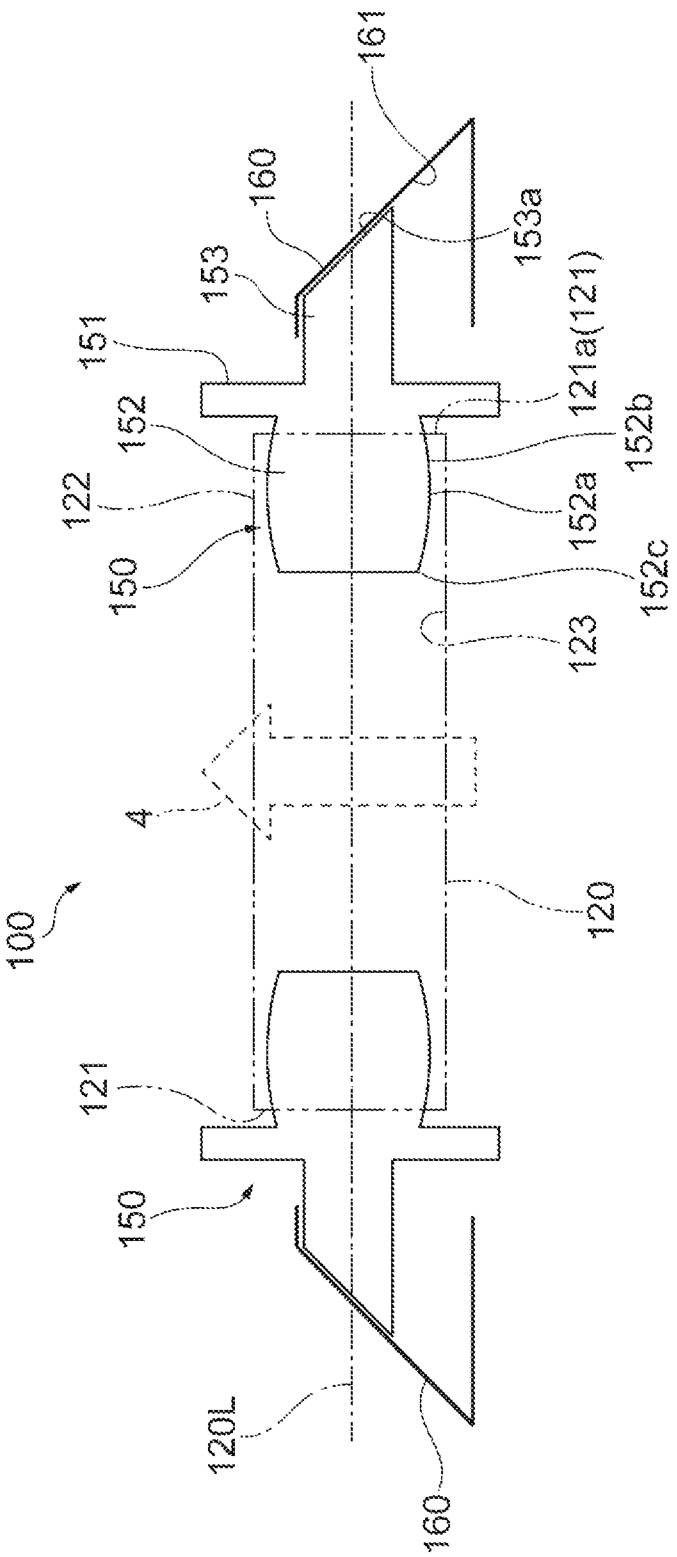
FIG. 6 is a schematic cross-sectional view of an example fixing device, illustrated in an example operational state.
Figure 7:
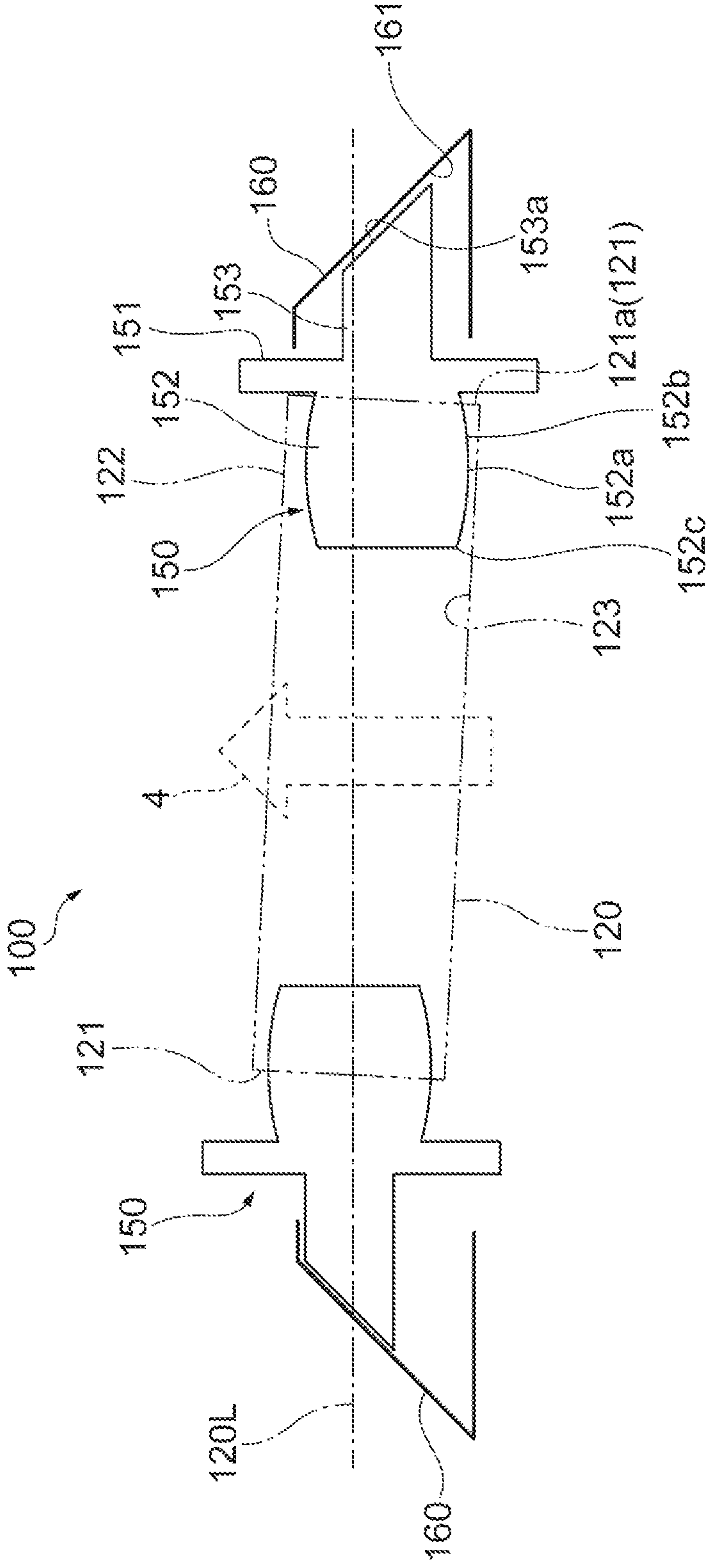
FIG. 7 is a schematic cross-sectional view of the fixing device of FIG. 6, illustrated in another example operational state.

FIGS. 6 and 7 illustrate an example fixing device 100 as viewed from a direction orthogonal to the conveyance direction of the sheet 3 and to a rotational axis 120L direction of the heating belt 120 (e.g. from a direction orthogonal to a plane extending along the conveyance direction of the sheet 3 and along a rotational axis 120L direction of the heating belt 120). Incidentally, in FIG. 6, the drive roller 140 is undepicted. The drive roller 140 of the fixing device 100 may include a drive roller 140 having a similar configuration as that of the drive roller 93 of the fixing device 90 illustrated in FIG. 2.

As illustrated in FIG. 6, the example fixing device 100 includes the heating belt 120, a bushing 150, and a guide wall 160. The heating belt 120 may have a similar configuration as that of the heating belt 91 illustrated in FIG. 2. Namely, the heating belt 120 has a tubular shape and is rotatable around a rotational axis 120L thereof, and extends longitudinally in the rotational axis 120L direction. In some examples, a heat source and a plate are disposed inside the heating belt 120. The heating belt 120 is driven to rotate by the drive roller 140.

The bushings 150 are located at opposite longitudinal ends of the heating belt 120. Each of the bushings 150 includes a shoulder 151, a stem 152, and a protrusion portion 153. The shoulder 151 is disposed adjacent to an edge 121 in the longitudinal direction of the heating belt 120. The shoulder 151 may have, for example, a plate shape that extends substantially orthogonally to the rotational axis 120L of the belt 120, such that a thickness of the plate extends in the longitudinal direction of the heating belt 120. The shoulder 151 has a wall surface that can contact the edge 121 of the heating belt 120. The distance between the shoulders 151 of the bushings 150 is greater than the length of the heating belt 120, such that the heating belt 120 is displaceable in the longitudinal direction relative to the bushing 150. Similarly to the configuration of the fixing device 90, the bushing 150 may be pressed toward a heating belt 120 by a biasing force of a spring or the like.

The stem 152 protrudes from the shoulder 151 toward the heating belt 120, and to the inside of the heating belt 120 to support the heating belt 120. The stem 152 has a substantially cylindrical shape and includes a convex portion 152*a* that comes into contact with an inner surface 123 of the heating belt 120 when the heating belt 120 is displaced in the longitudinal direction. The stem 152 in one example may have a so-called barrel shape. Namely, the diameter taken at an axial center of the stem 152 is greater than the diameter taken at an axial end portion of the stem 152. The stem 152 has an outer peripheral surface 152*b* which is smoothly curved such that the axial center of the stem 152 is outwardly convex. The outer peripheral surface 152*b* may be curved (e.g., in an arcuate shape) from a proximal end (located adjacent the shoulder 151) to a distal end (located inside the heating belt 120) along an axial direction.

The protrusion portion 153 protrudes from a side of the shoulder 151 that is opposite to the stem 152. A distal end side of the protrusion portion 153 forms an inclined portion 153*a* that extends in an oblique direction relative to the longitudinal direction of the heating belt 120, away from the shoulder 151 and toward the upstream side in the conveyance direction of the conveyance path 4.

When the heating belt 120 moves toward the bushing 150, the guide wall 160 guides the bushing 150 such that the bushing 150 moves toward the upstream side of the conveyance direction in the conveyance path 4. The guide wall 160 is disposed adjacent to the bushing 150. Namely, the guide wall 160 is disposed opposite to the heating belt 120 relative to the bushing 150. In one example, the guide wall 160 has an inclined surface 161 facing the inclined portion 153*a* of the protrusion portion 153. The inclined surface 161 extends straight in the oblique direction relative to the longitudinal direction of the heating belt 120, away from the heating belt 120 and toward the upstream side in the conveyance direction.

In the example fixing device 100, when the heating belt 120 moves in the longitudinal direction to come into contact with the shoulder 151, an edge 121*a* of the heating belt 120 presses against the bushing 150. The inclined portion 153*a* of the protrusion portion 153 slides along the inclined surface 161 of the guide wall 160, so that the bushing 150 pressed toward the guide wall 160 moves along the guide wall 160 toward the upstream side of the conveyance direction as illustrated in FIG. 7. In this case, the inner surface 123 of an end portion 122 on a movement direction side in the heating belt 120 (e.g., the end portion 122 corresponding to the direction of the longitudinal movement of the heating belt 120), is pressed by the stem 152 of the bushing 150 moving toward the upstream side of the conveyance direction. As described above, the force toward the upstream side is applied to the end portion 122 on the movement direction side in the heating belt 120, thereby changing the alignment of the heating belt 120 relative to the drive roller 140. Consequently, the heating belt 120 moves in a direction away from the shoulder 151, thereby correcting the posture (or alignment) of the heating belt 120.

The stem 152 of the fixing device 100 includes the convex portion 152*a* that comes into contact with the inner surface 123 of the heating belt 120 when the heating belt 120 is displaced in the longitudinal direction. For this reason, when the bushing 150 moves toward the upstream side of the conveyance direction, the inner surface 123 of the heating belt 120 is protected from being impacted by a corner edge 152*c* on a distal end side of the stem 152, as the contact area between the inner surface 123 of the heating belt 120 and the stem 152 is relatively large, and the force that is applied from the stem 152 to the heating belt 120 is unlikely to be concentrated at one location. Consequently, damage to the heating belt is inhibited.

Figure 8:
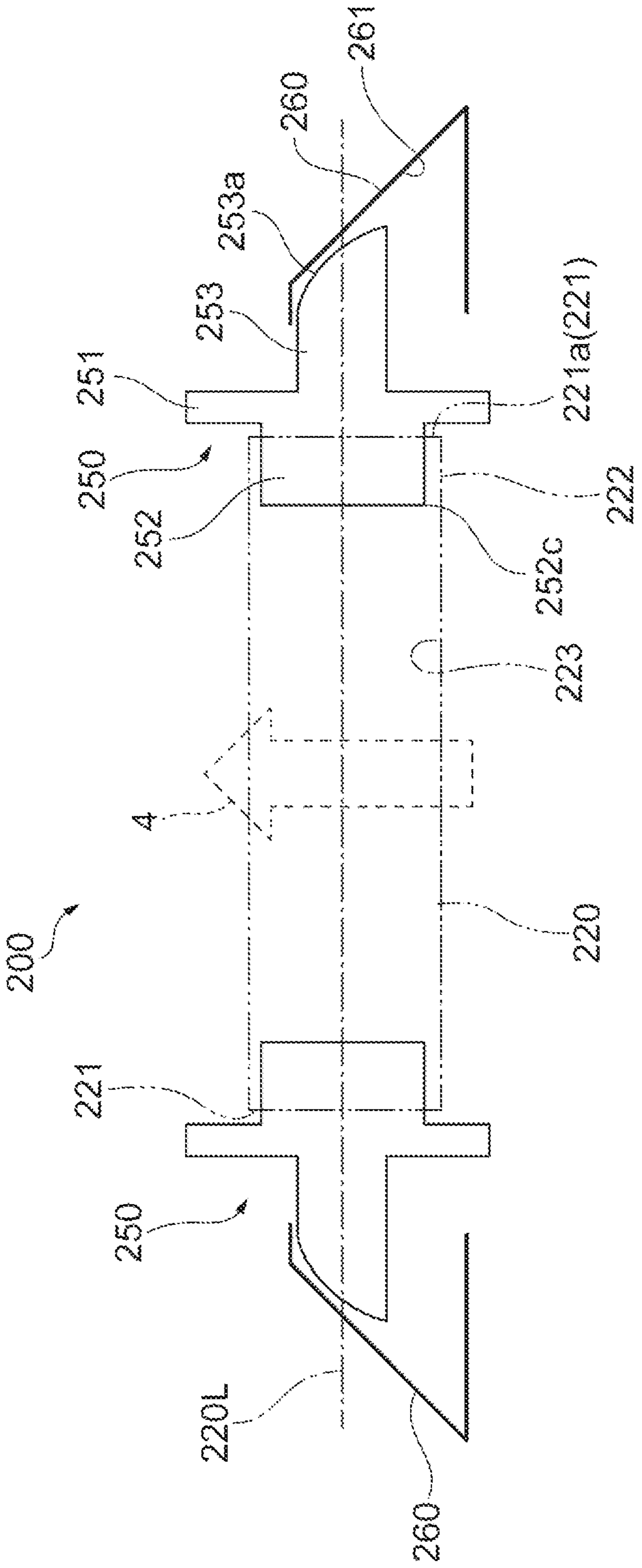
FIG. 8 is a schematic cross-sectional view of an example fixing device, illustrated in an example operational state.
Figure 9:
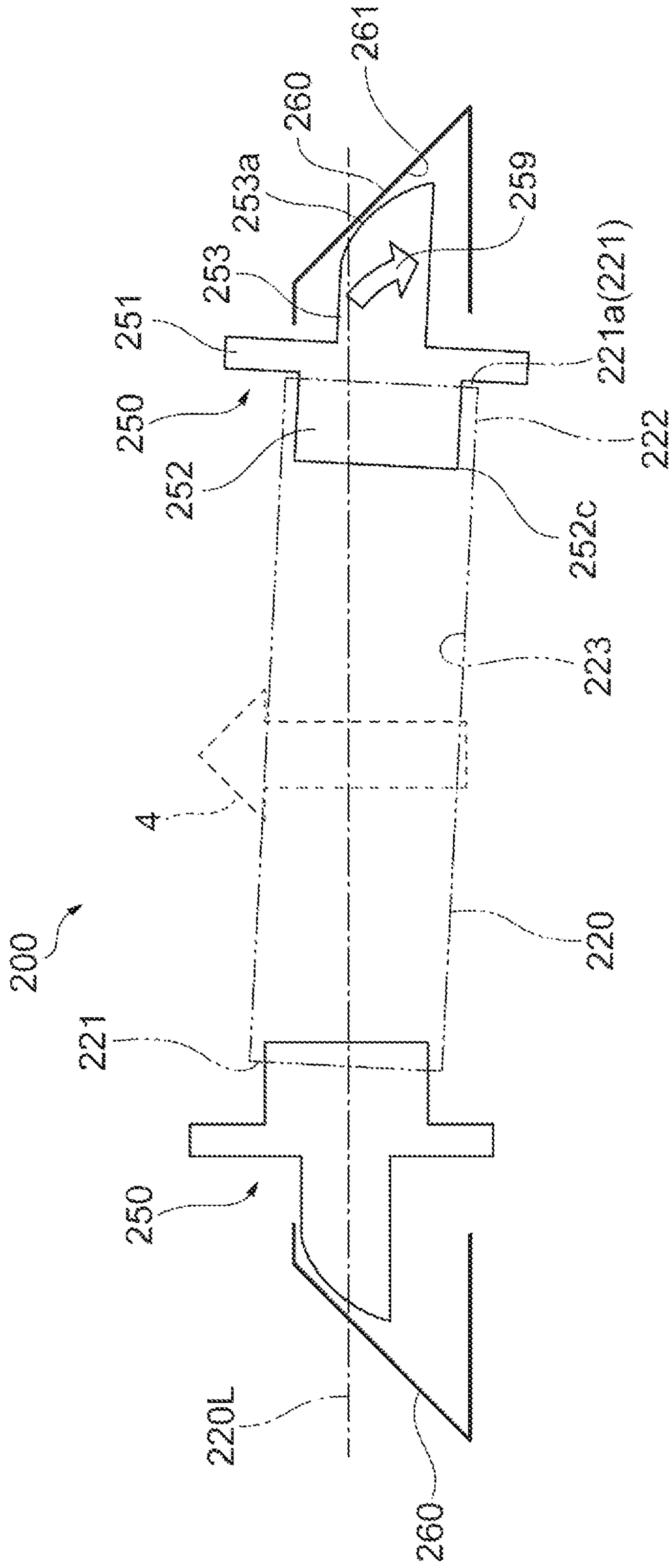
FIG. 9 is a schematic cross-sectional view of the fixing device of FIG. 8, illustrated in another example operational state.

FIGS. 8 and 9 illustrate another example fixing device 200 as viewed from a direction orthogonal to a conveyance direction 4 of the sheet 3 and to a rotational axis 220L direction of a heating belt 220, and shown without any drive roller. According to examples, the fixing device 200 may include a driving roller 93 similarly to the fixing device 90 illustrated in FIG. 2.

The example fixing device 200 includes the heating belt 220, a bushing 250, and a guide wall 260. The heating belt 220 may have a similar configuration as that of the heating belt 91 illustrated in FIG. 2. Namely, the heating belt 220 is a belt that has a tubular shape and is rotatable around a rotational axis 220L thereof, and extends in a longitudinal direction that is the rotational axis 220L direction. For example, a heat source and a plate are disposed inside the heating belt 220. The heating belt 220 is driven to rotate by the drive roller.

The bushings 250 are disposed at opposite ends of the heating belt 220. The bushing 250 includes a shoulder 251, a stem 252, and a protrusion portion 253. The shoulder 251 is disposed adjacent to an edge 221 in the longitudinal direction of the heating belt 220. The shoulder 251 may have, for example, a plate shape extending substantially orthogonally to the longitudinal axis of the heating belt 220. The shoulder 251 has a wall surface that can come into contact with the edge 221 of the heating belt 220. The distance between the shoulders 251 of the bushings 250 is greater than the length of the heating belt 220. For this reason, the heating belt 220 is displaceable in the longitudinal direction relative to the bushings 250. Similarly to the configuration of the fixing device 90, the bushings 250 may be pressed toward the heating belt 220 by the biasing force of a spring or the like.

The stem 252 protrudes from the shoulder 251 toward the heating belt 220, and to the inside of the heating belt 220 to support the heating belt 220. The stem 252 has a substantially cylindrical shape.

The protrusion portion 253 protrudes from the shoulder 251, on a side opposite to the stem 252. A distal end side of the protrusion portion 253 forms an inclined portion 253*a* that forms a surface extending in an oblique direction relative to the longitudinal direction of the heating belt 220, away from the shoulder 251 and toward the upstream side in the conveyance direction of the conveyance path 4. When viewed from the direction orthogonal to the conveyance direction of the sheet 3 and to the rotational axis 220L direction of the heating belt 220, the inclined portion 253*a* has a smoothly curved surface shape so as to be convex toward an inclined surface 261 to be described later. For example, the inclined portion 253*a* may be formed in an arcuate shape from a proximal end (located closer to the shoulder 251) to a distal end (located away from the shoulder 251) in an extending direction.

With reference to FIG. 9, when the heating belt 220 moves toward the bushing 250, the guide wall 260 guides the bushing 250 such that the bushing 250 moves along an arcuate path 259 toward the upstream side of the conveyance direction in the conveyance path 4. The guide wall 260 is disposed adjacent to the bushing 250, on a side of the bushing 250 that is opposite to the heating belt 220. In one example, the guide wall 260 forms the inclined surface 261 facing the inclined portion 253*a* of the protrusion portion 253. The inclined surface 261 extends substantially linearly in the oblique direction relative to the longitudinal direction of the heating belt 220, toward the upstream side in the conveyance direction.

When the heating belt 220 moves in the longitudinal direction to come into contact with the shoulder 251, an edge 221*a* of the heating belt 220 presses against the bushing 250. The inclined portion 253*a* of the protrusion portion 253 slides along the inclined surface 261 of the guide wall 260, so that the bushing 250 pressed toward the guide wall 260 moves along the guide wall 260 toward the upstream side of the conveyance direction as illustrated in FIG. 9. In this case, an inner surface 223 of an end portion 222 on a movement direction side in the heating belt 220 (e.g., the end portion 222 corresponding to the direction of the longitudinal movement of the heating belt 220), is pressed by the stem 252 of the bushing 250 moving toward the upstream side of the conveyance direction. As described above, the force toward the upstream side is applied to the end portion 222 on the movement direction side in the heating belt 220, which in turn changes the alignment of the heating belt 220 relative to the drive roller. Consequently, the heating belt 220 moves in a direction away from the shoulder 251, and the posture (or alignment) of the heating belt 220 is thereby corrected.

The bushing 250 of the fixing device 200 forms the inclined portion 253*a* including an end surface that comes into contact with the guide wall 260. The end surface of the inclined portion 253*a* is formed from the proximal end to the distal end in the extending direction so as to be convex toward the inclined surface 261. As one example, the end surface of the inclined portion 253*a* is formed in an arcuate shape from the proximal end to the distal end in the extending direction. Consequently, when the inclined portion 253*a* is engaged with the guide wall 260, the bushing 250 moves along the arcuate path 259. Here, the arcuate path 259 is illustrated to schematically represent the movement of the bushing 250 for ease of understanding, and does not necessarily illustrate the movement path of the bushing 250 with accuracy. When the bushing 250 is pressed against the heating belt 220, the inclined portion 253*a* can slide along the inclined surface 261 and the bushing 250 can rotate around a contact portion of the inclined portion 253*a* with the inclined surface 261. As described above, the arcuate path 259 depicts a state where the bushing 250 moves obliquely toward the upstream side of the conveyance direction and a state where the angle of the bushing 250 is changed such that the axial angle of the stem 252 is changed.

When the bushing 250 moves along the arcuate path 259 toward the upstream side of the conveyance direction, a corner edge 252*c* on a distal end of the stem 252 (located distally from the shoulder 251) is inhibited from pressing against the inner surface 223 of the heating belt 220. As in the illustrated example, in a case where the inclined portion 253*a* has an arcuately curved surface, the magnitude of rotation of the bushing 250 can be changed steplessly (gradually). For this reason, the magnitude of rotation of the bushing 250 can be automatically adjusted while minimizing friction between the inner surface 223 of the heating belt 220 and an outer peripheral surface of the stem 252. Namely, the magnitude of rotation of the bushing 250 can be automatically adjusted such that an axial direction of the heating belt 220 coincides with an axial direction of the stem 252.

Figure 10:
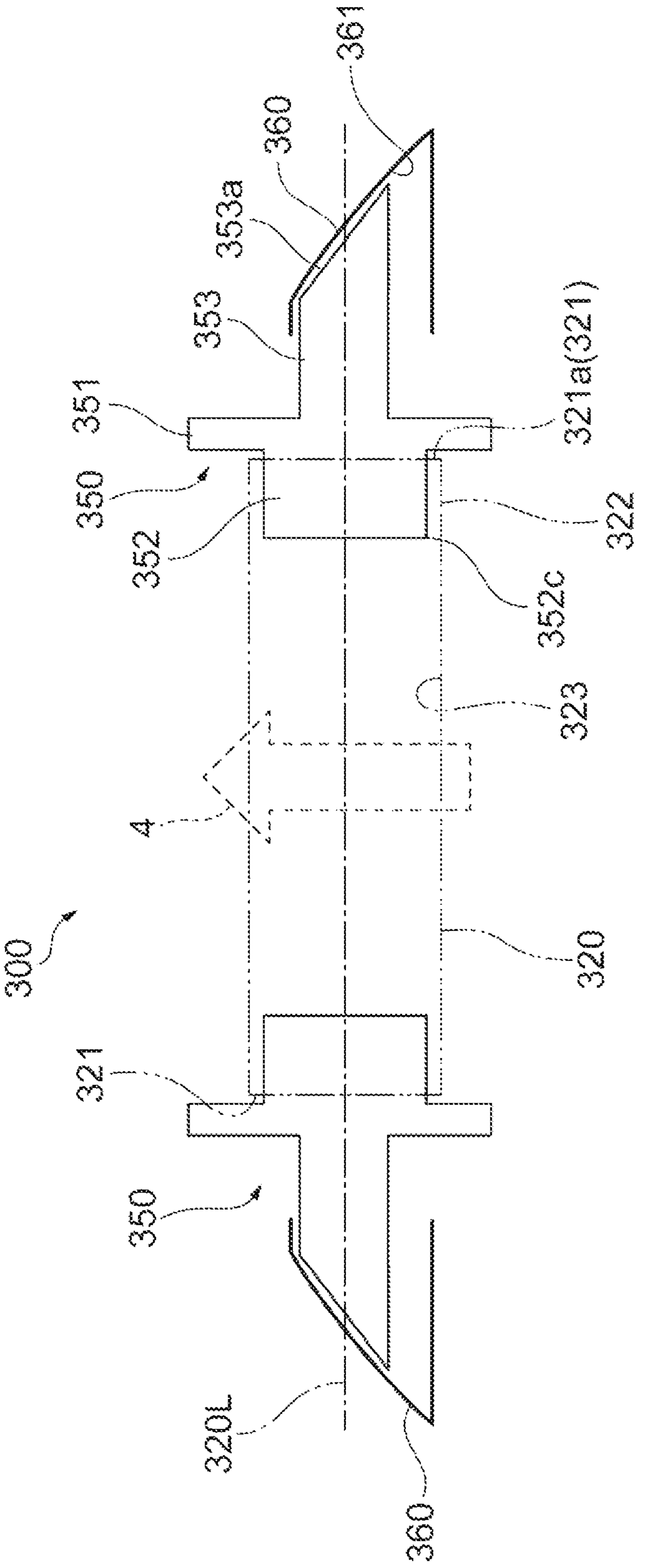
FIG. 10 is a schematic cross-sectional view of an example fixing device, illustrated in an example operational state.
Figure 11:
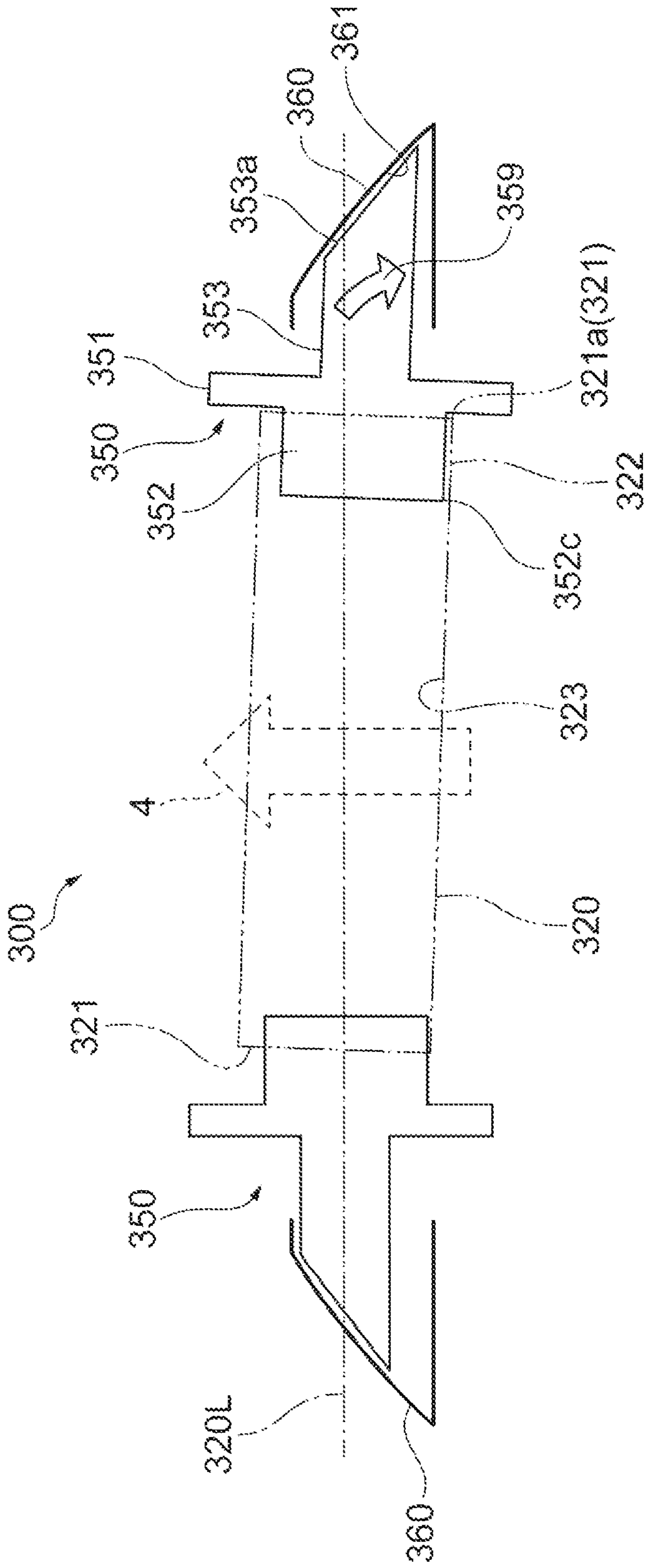
FIG. 11 is a schematic cross-sectional view of the fixing device of FIG. 10, illustrated in another example operational state.

FIGS. 10 and 11 illustrate another example fixing device 300 as viewed from a direction orthogonal to a conveyance direction 4 of the sheet 3 and to a rotational axis 320L direction of a heating belt 320, and shown without any drive roller. Accordingly to examples, the fixing device 300 may include a driving roller 93 similarly to the fixing device 90 illustrated in FIG. 2.

The example fixing device 300 includes the heating belt 320, a bushing 350, and a guide wall 360. The heating belt 320 may have a similar configuration as that of the heating belt 91 illustrated in FIG. 2. Namely, the heating belt 320 is a belt that has a tubular shape and is rotatable around a rotational axis 320L thereof, and extends in a longitudinal direction that is the rotational axis 320L direction. For example, a heat source and a plate are disposed inside the heating belt 320. The heating belt 320 is driven to rotate by the drive roller.

The bushings 350 are disposed opposite ends of the heating belt 320. The bushing 350 includes a shoulder 351, a stem 352, and a protrusion portion 353. The shoulder 351 is disposed adjacent to an edge 321 in the longitudinal direction of the heating belt 320. The shoulder 351 may have, for example, a plate shape extending substantially orthogonally to the longitudinal axis of the heating belt 320. The shoulder 351 has a wall surface that can come into contact with the edge 321 of the heating belt 320. The distance between the shoulders 351 of the bushings 350 is greater than the length of the heating belt 320. For this reason, the heating belt 320 is displaceable in the longitudinal direction relative to the bushings 350. Similarly to the configuration of the fixing device 90, the bushings 350 may be pressed toward the heating belt 320 by the biasing force of a spring or the like.

The stem 352 protrudes from the shoulder 351 toward the heating belt 320, and to the inside of the heating belt 320 to support the heating belt 320. The stem 352 has a substantially cylindrical shape.

The protrusion portion 353 protrudes from the shoulder 351, on a side opposite to the stem 352. A distal end of the protrusion portion 353 forms an inclined portion 353*a* that has a planar shape and extends in an oblique direction relative to the longitudinal direction of the heating belt 320, away from the shoulder 351 and toward the upstream side in the conveyance direction of the conveyance path 4.

With reference to FIG. 11, when the heating belt 320 moves toward the bushing 350, the guide wall 360 guides the bushing 350 such that the bushing 350 moves along an arcuate path 359 toward the upstream side of the conveyance direction in the conveyance path 4. The guide wall 360 is disposed adjacent to the bushing 350, on a side of the bushing 350 opposite to the heating belt 320. In one example, the guide wall 360 forms an inclined surface 361 facing the inclined portion 353*a* of the protrusion portion 353. The inclined surface 361 extends in the oblique direction relative to the longitudinal direction of the heating belt 320, away from the heating belt 320 and toward the upstream side in the conveyance direction. When viewed from the direction orthogonal to the conveyance direction of the sheet 3 and to the rotational axis 320L direction of the heating belt 320, the inclined surface 361 has a smoothly curved surface shape so as to be concave relative to the inclined portion 353*a*. For example, the inclined surface 361 may be formed in an arcuate shape from one end to the other end in an extending direction. In addition, the inclined surface 361 may be curved such that the curvature is continuously changed from the one end to the other end in the extending direction.

When the heating belt 320 moves in the longitudinal direction to come into contact with the shoulder 351, an edge 321*a* of the heating belt 320 presses against the bushing 350. The inclined portion 353*a* of the protrusion portion 353 slides along the inclined surface 361 of the guide wall 360, so that the bushing 350 pressed toward the guide wall 360 moves along the guide wall 360 toward the upstream side of the conveyance direction as illustrated in FIG. 11. In this case, an inner surface 323 of an end portion 322 on a movement direction side in the heating belt 320 (e.g., the end portion 322 corresponding to the direction of the longitudinal movement of the heating belt 320), is pressed by the stem 352 of the bushing 350 moving toward the upstream side of the conveyance direction. As described above, the force toward the upstream side is applied to the end portion 322 on the movement direction side in the heating belt 320, which in turn changes the alignment of the heating belt 320 relative to the drive roller. Consequently, the heating belt 320 moves in a direction away from the shoulder 351, and the posture (or alignment of the heating belt 320 is thereby corrected.

When viewed from the direction orthogonal to the conveyance direction of the sheet 3 and to the rotational axis 320L direction of the heating belt 320, the inclined surface 361 of the guide wall 360 is formed to be concave relative to the inclined portion 353*a* from a proximal end to a distal end in the extending direction. Consequently, when the inclined portion 353*a* is engaged with the guide wall 360, the bushing 350 moves along the arcuate path 359. Here, the arcuate path 359 is illustrated to schematically represent the movement of the bushing 350 for ease of understanding, and does not necessarily illustrate the actual movement path of the bushing 350 with accuracy. When the bushing 350 is pressed against the heating belt 320, the inclined portion 353*a* can slide along the inclined surface 361 and the bushing 350 can rotate due to a concave shape of the inclined surface 361. As described above, the arcuate path 359 depicts a state where the bushing 350 moves obliquely toward the upstream side of the conveyance direction and a state where the angle of the bushing 350 is changed such that the axial angle of the stem 352 is changed.

When the bushing 350 moves along the arcuate path 359 toward the upstream side of the conveyance direction, a corner edge 352*c* on a distal end side of the stem 352 is inhibited from pressing the inner surface 323 of the heating belt 320. As in the illustrated example, in a case where the inclined surface 361 is an arcuately curved surface, the magnitude of rotation of the bushing 350 is determined by the position of the bushing 350 relative to the inclined surface 361 in the conveyance direction. In addition, the axial inclination of the heating belt 320 is also determined by the position of the bushing 350 relative to the inclined surface 361 in the conveyance direction. Therefore, in one example, the inclined surface 361 may be formed such that an axial direction of the heating belt 320 coincides with an axial direction of the stem 352. In this case, an outer peripheral surface of the stem 252 and the inner surface 323 of the heating belt 320 are parallel to each other, and thus damage to the heating belt 320 is inhibited.

Figure 12:
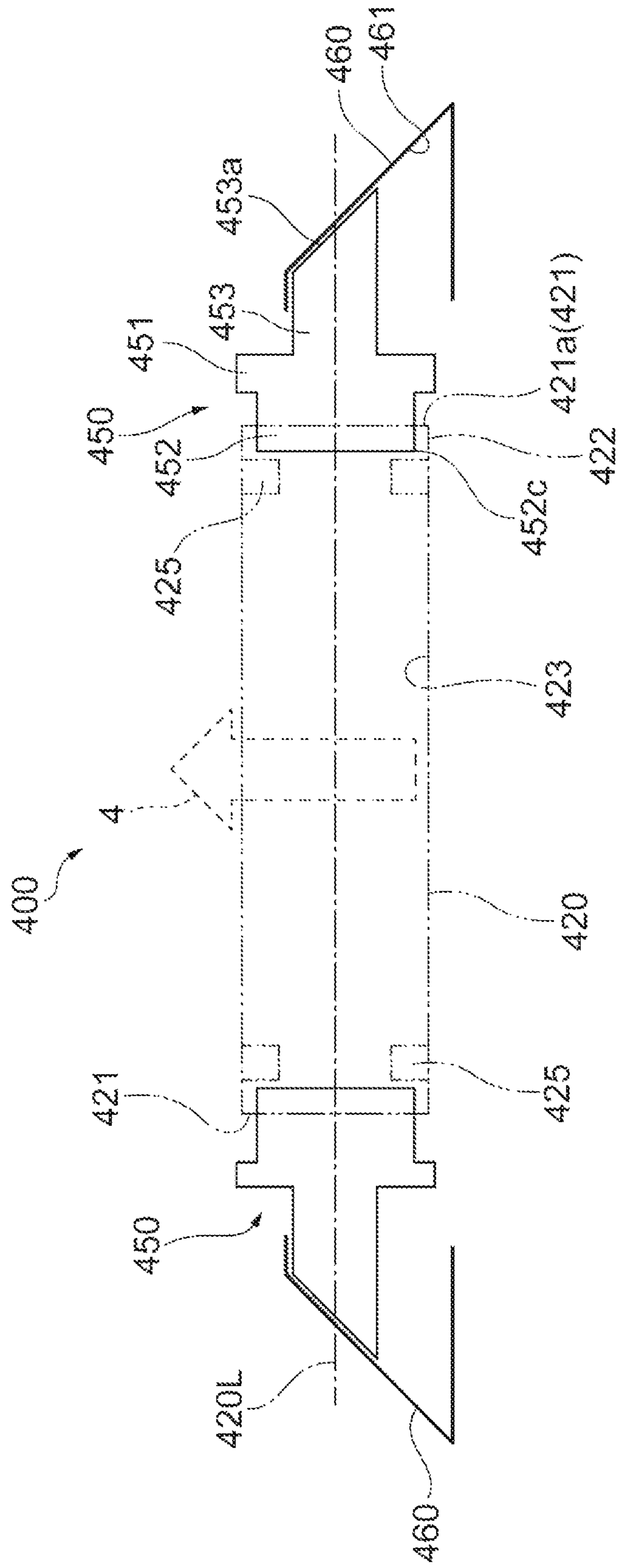
FIG. 12 is a schematic cross-sectional view of an example fixing device, illustrated in an example operational state.
Figure 13:
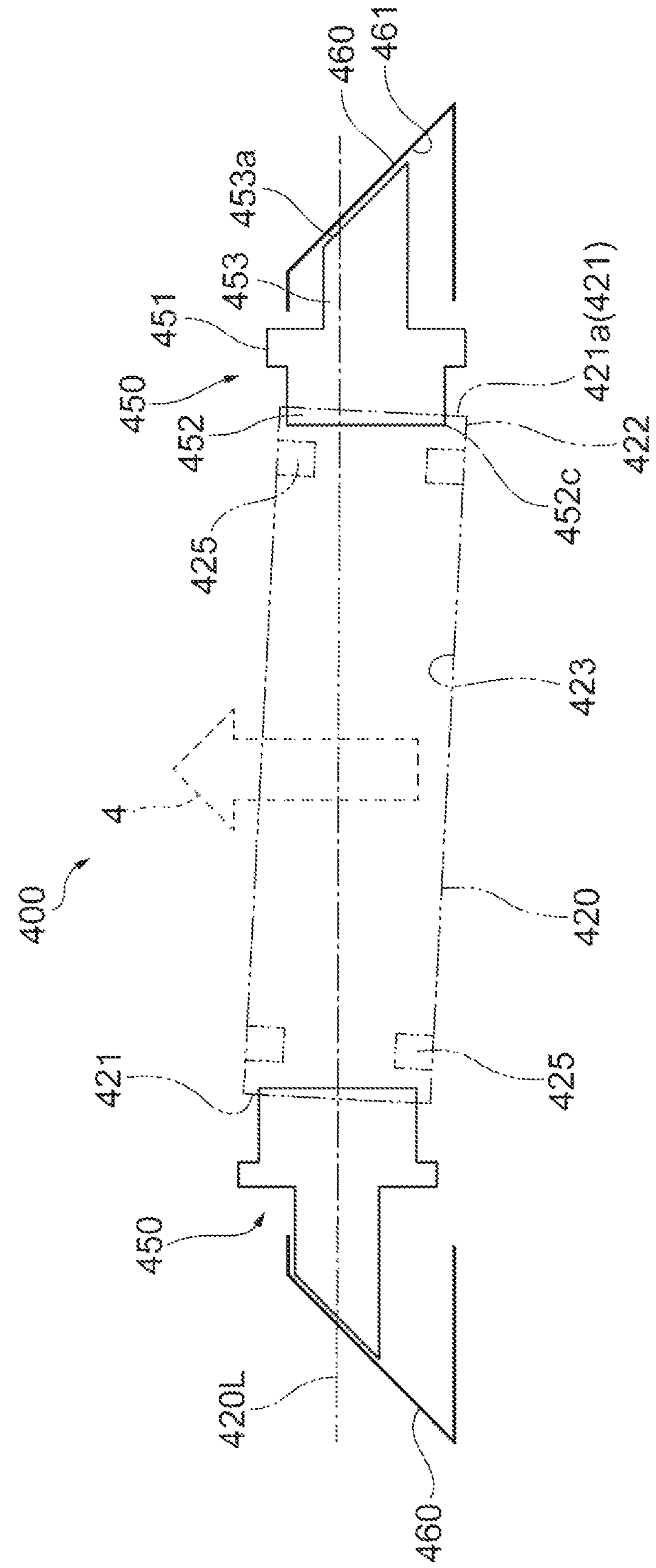
FIG. 13 is a schematic cross-sectional view of the fixing device of FIG. 12, illustrated in another example operational state.

FIGS. 12 and 13 illustrate another example fixing device 400 as viewed from a direction orthogonal to the conveyance direction of the sheet 3 and to a rotational axis 420L direction of a heating belt 420, and shown without any drive roller. According to examples, the fixing device 200 may include a driving roller 93 similarly to the fixing device 90 illustrated in FIG. 2.

The example fixing device 400 includes the heating belt 420, a bushing 450, and a guide wall 460. The heating belt 420 may have a similar configuration as that of the heating belt 91 illustrated in FIG. 2. Namely, the heating belt 420 is a belt that has a tubular shape and is rotatable around a rotational axis 420L thereof, and extends in a longitudinal direction that is the rotational axis 420L direction. For example, a heat source and a plate are disposed inside the heating belt 420. The heating belt 420 is driven to rotate by the drive roller.

In addition, the heating belt 420 is displaceable in the longitudinal direction away from a shoulder 451 to avoid contact between an edge 421 of the heating belt 420 and the shoulder 451 to be described later. In one example, the heating belt 420 includes an inner surface 423 and a rib 425 that extends on the inner surface 423 in an end portion of the heating belt 420. The rib 425 is formed all around the inner surface 423 in a circumferential direction to form a ring shape. The edge 421 of the heating belt 420 is located more outwardly than the rib 425 in the longitudinal direction. Namely, the rib 425 is spaced away from the edge 421 inside the heating belt 420.

The bushings 450 are disposed at opposite ends of the heating belt 420. The bushing 450 includes the shoulder 451, a stem 452, and a protrusion portion 453. The shoulder 451 is disposed adjacent to the edge 421 in the longitudinal direction of the heating belt 420. The shoulder 451 may have, for example, a plate shape extending substantially orthogonally to the longitudinal axis of the heating belt 420. The distance between the shoulders 451 of the bushings 450 is greater than the length of the heating belt 420. Similarly to the configuration of the fixing device 90, the bushings 450 may be pressed toward the heating belt 420 by the biasing force of a spring or the like.

The stem 452 protrudes from the shoulder 451 toward the heating belt 420. The distance between the stems 452 of the bushings 450 is shorter than the longitudinal length of the heating belt 420. The stems 452 extend to the inside of the heating belt 420 to support the heating belt 420, and have a substantially cylindrical shape. The axial length of the stem 452 is longer than the length of a segment of the heating belt 420 taken from the rib 425 to the edge 421 in the longitudinal direction. The segment of the heating belt 420 is the portion of the heating belt 420 which extends outwardly from the rib 425 in the longitudinal direction. In addition, the diameter of the stem 452 is larger than the inner diameter of the rib 425.

The protrusion portion 453 protrudes from the shoulder 451, on a side opposite to the stem 452. A distal end side of the protrusion portion 453 forms an inclined portion 453*a* that forms a surface extending in an oblique direction relative to the longitudinal direction of the heating belt 420, away from the shoulder 451 and toward the upstream side in the conveyance direction of the conveyance path 4.

With reference to FIG. 13, when the heating belt 420 moves toward the bushing 450, the guide wall 460 guides the bushing 450 such that the bushing 450 moves toward the upstream side of the conveyance direction in the conveyance path 4. The guide wall 460 is disposed adjacent to the bushing 450, on a side of the bushing 450 that is opposite to the heating belt 420. In one example, the guide wall 460 forms an inclined surface 461 facing the inclined portion 453*a* of the protrusion portion 453. The inclined surface 461 extends substantially linearly in the oblique direction relative to the longitudinal direction of the heating belt 420, toward the upstream side in the conveyance direction.

When the heating belt 420 moves in the longitudinal direction to come into contact with the bushing 450, the heating belt 420 presses against the bushing 450. The inclined portion 453*a* of the protrusion portion 453 slides along the inclined surface 461 of the guide wall 460, so that the bushing 450 pressed toward the guide wall 460 moves along the guide wall 460 toward the upstream side of the conveyance direction as illustrated in FIG. 13. In this case, the inner surface 423 of an end portion 422 on a movement direction side in the heating belt 420 (e.g., the end portion 422 corresponding to the direction of the longitudinal movement of the heating belt 420), is pressed by the stem 452 of the bushing 450 moving toward the upstream side of the conveyance direction. As described above, the force toward the upstream side is applied to the end portion 422 on the movement direction side in the heating belt 420, which in turn changes the alignment of the heating belt 420 relative to the drive roller. Consequently, the heating belt 420 moves in a direction away from the bushing 450, and the posture (or alignment) of the heating belt 420 is thereby corrected.

The heating belt 420 of the fixing device 400 includes a pair of the ribs 425 on the right and left in an axial direction. When the heating belt 420 moves toward the bushing 450, the rib 425 comes into contact with an end portion of the bushing 450, namely, the distal end of the stem 452. The stem 452 is pressed against the rib 425, and thus the bushing 450 is pressed toward the guide wall. As illustrated in FIG. 13, the rib 425 is spaced away from an edge 421*a* of the heating belt 420 such that a gap is maintained between the edge 421*a* of the heating belt 420 and the shoulder 451 of the bushing 450 when the rib 425 comes into contact with the distal end of the stem 452. Consequently, when the bushing 450 is pressed by the heating belt 420, the shoulder 451 is prevented from causing damage to the edge 421*a* of the heating belt 420.

Figure 14:
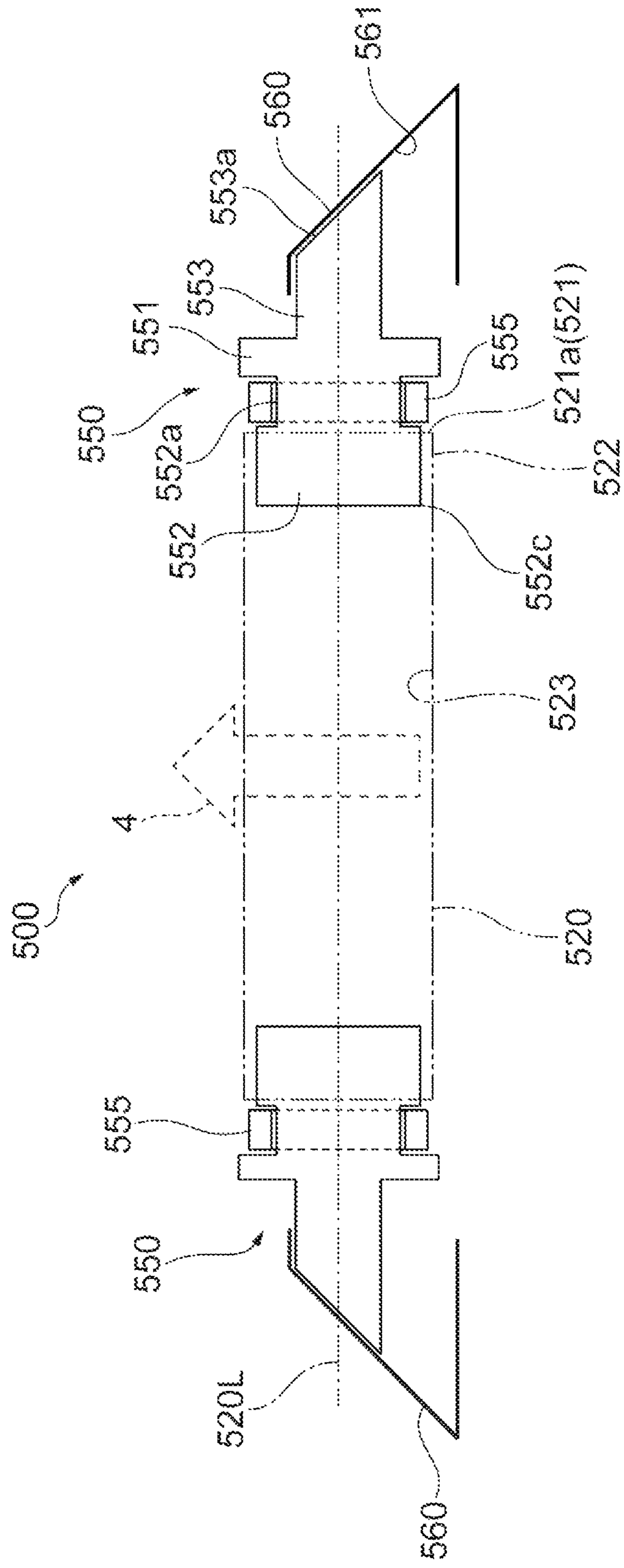
FIG. 14 is a schematic cross-sectional view of an example fixing device, illustrated in an example operational state.
Figure 15:
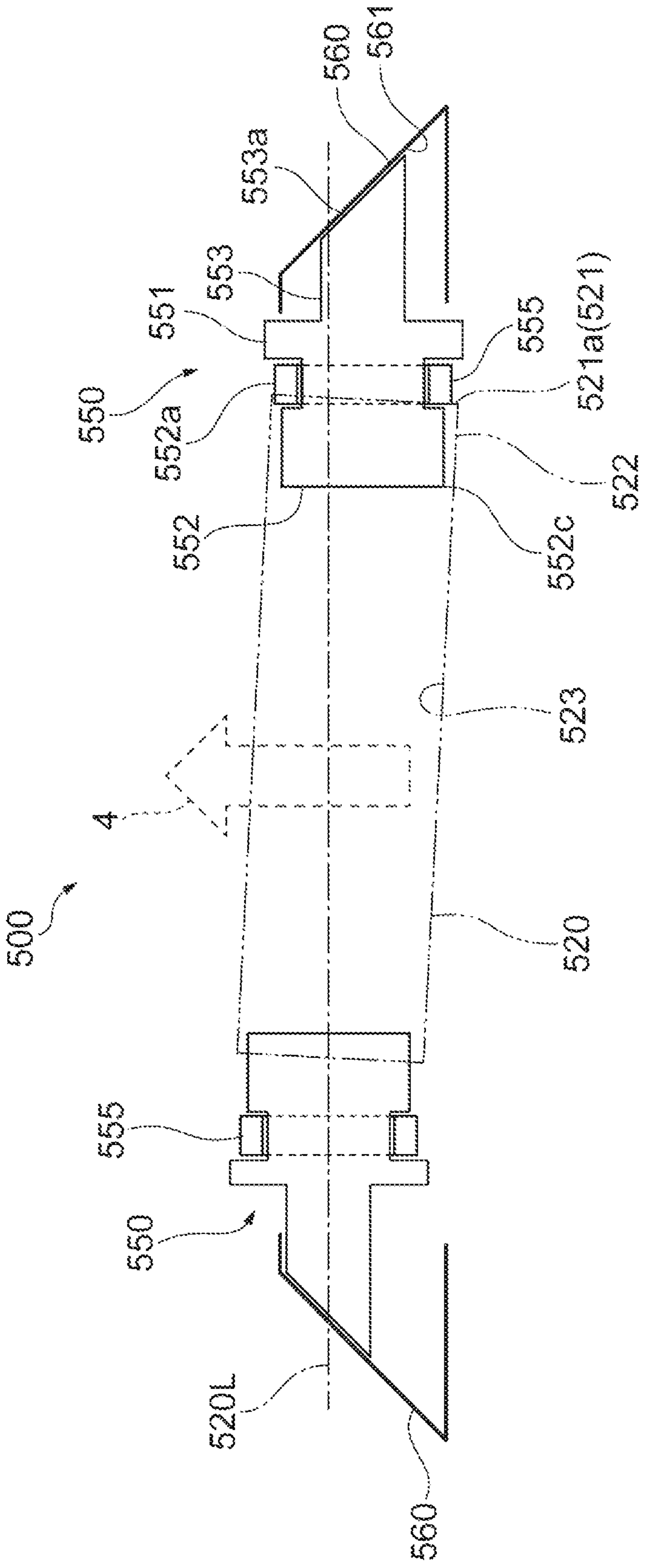
FIG. 15 is a schematic cross-sectional view of the fixing device of FIG. 14, illustrated in another example operational state.

FIGS. 14 and 15 illustrate another example fixing device 500 as viewed from a direction orthogonal to a conveyance direction of the sheet 3 and to a rotational axis 520L direction of a heating belt 520, shown without any drive roller. According to examples, the fixing device 500 may include a driving roller 93 similarly to the fixing device 90 illustrated in FIG. 2.

The example fixing device 500 includes the heating belt 520, a bushing 550, and a guide wall 560. The heating belt 520 may have a similar configuration as that of the heating belt 91 illustrated in FIG. 2. Namely, the heating belt 520 is a belt that has a tubular shape and is rotatable around a rotational axis 520L thereof, and extends in a longitudinal direction that is the rotational axis 520L direction. For example, a heat source and a plate are disposed inside the heating belt 520. The heating belt 520 is driven to rotate by the drive roller.

The bushings 550 are disposed at opposite ends of the heating belt 520. The bushing 550 includes a shoulder 551, a stem 552, and a protrusion portion 553. The shoulder 551 is disposed adjacent to an edge 521 in the longitudinal direction of the heating belt 520. The shoulder 551 may have, for example, a plate shape extending substantially orthogonally to the longitudinal axis of the heating belt 520. The shoulder 551 has a wall surface 551*a* that can come into contact with the edge 521 of the heating belt 520. The distance between the shoulders 551 of the bushings 550 is greater than the length of the heating belt 520. For this reason, the heating belt 520 is displaceable in the longitudinal direction relative to the bushings 550. Similarly to the configuration of the fixing device 90, the bushings 550 may be pressed toward the heating belt 520 by the biasing force of a spring or the like.

The stem 552 protrudes from the shoulder 551 toward the heating belt 520, and to the inside of the heating belt 520 to support the heating belt 520. The stem 552 has a substantially cylindrical shape. A groove portion 552*a* that is recessed inward in a radial direction is formed in an end portion on a shoulder 551 side in the stem 552. The groove portion 552*a* is formed all around the stem 552 in a circumferential direction to have a ring shape. The groove portion 552*a* is provided with a flange 555 having a ring shape. As described above, the bushing 550 further includes the flange 555 mounted around the stem 552. The flange 555 is located between the shoulder 551 and the heating belt 520 in the longitudinal direction. The inner diameter of the flange 555 is larger than the outer diameter of the groove portion 552*a*. Namely, the flange 555 is rotatably supported in the groove portion 552*a*. In addition, the outer diameter of the flange 555 is larger than the outer diameter of a portion of the stem 552, the portion being closer to a distal end side than the groove portion 552*a*. The friction coefficient between the heating belt 520 and the flange 555 is greater than the friction coefficient between the heating belt 520 and the stem 552.

The protrusion portion 553 protrudes from the shoulder 551, on a side opposite to the stem 552. A distal end side of the protrusion portion 553 forms an inclined portion 553*a* that has a surface shape and extends in an oblique direction relative to the longitudinal direction of the heating belt 520, away from the shoulder 551 and toward the upstream side in the conveyance direction of the conveyance path 4.

With reference to FIG. 15, when the heating belt 520 moves toward the bushing 550, the guide wall 560 guides the bushing 550 such that the bushing 550 moves toward the upstream side of the conveyance direction in the conveyance path 4. The guide wall 560 is disposed adjacent to the bushing 550, on a side of the bushing 550 that is opposite to the heating belt 520. In one example, the guide wall 560 forms an inclined surface 561 facing the inclined portion 553*a* of the protrusion portion 553. The inclined surface 561 extends substantially linearly in the oblique direction relative to the longitudinal direction of the heating belt 520, toward the upstream side in the conveyance direction.

When the heating belt 520 moves in the longitudinal direction, the heating belt 520 presses against the bushing 550. The inclined portion 553*a* of the protrusion portion 553 slides along the inclined surface 561 of the guide wall 560, so that the bushing 550 pressed toward the guide wall 560 moves along the guide wall 560 toward the upstream side of the conveyance direction as illustrated FIG. 15. In this case, an inner surface 523 of an end portion 522 on a movement direction side in the heating belt 520 (e.g., the end portion 522 corresponding to the direction of the longitudinal movement of the heating belt 520), is pressed by the stem 552 of the bushing 550 moving toward the upstream side of the conveyance direction. As described above, the force toward the upstream side is applied to the end portion 522 on the movement direction side in the heating belt 520, which in turn changes the alignment of the heating belt 520 relative to the drive roller. Consequently, the heating belt 520 moves in a direction away from the bushing 550, and the posture (or alignment) of the heating belt 520 is thereby corrected.

In the bushing 550 of the fixing device 500, the stem 552 includes the flange 555. When the heating belt 520 moves toward the bushing 550, an edge 521*a* of the heating belt 520 comes into contact with the flange 555, as illustrated in FIG. 15. The flange 555 is pressed against the heating belt 520, and thus the bushing 550 is pressed toward the guide wall 560 via the flange 555. In this case, the heating belt 520 is displaceable in the longitudinal direction away from the shoulder 551. As described above, in one example, the flange 555 transmits force from the heating belt 520 to the bushing 550 such that a gap is maintained between the edge 521 of the heating belt 520 and the shoulder 551 when the heating belt 520 moves toward the shoulder 551. Namely, since contact between the edge 521 of the heating belt 520 and the shoulder 551 is avoided, the shoulder 551 is prevented from causing damage to the edge 521*a* of the heating belt 520. Since the friction coefficient between the heating belt 520 and the flange 555 is greater than the friction coefficient between the heating belt 520 and the stem 552, the heating belt 520 moving along an axial direction can slide on a distal end side of the stem 552 to come into contact with the flange 555.

Figure 16:
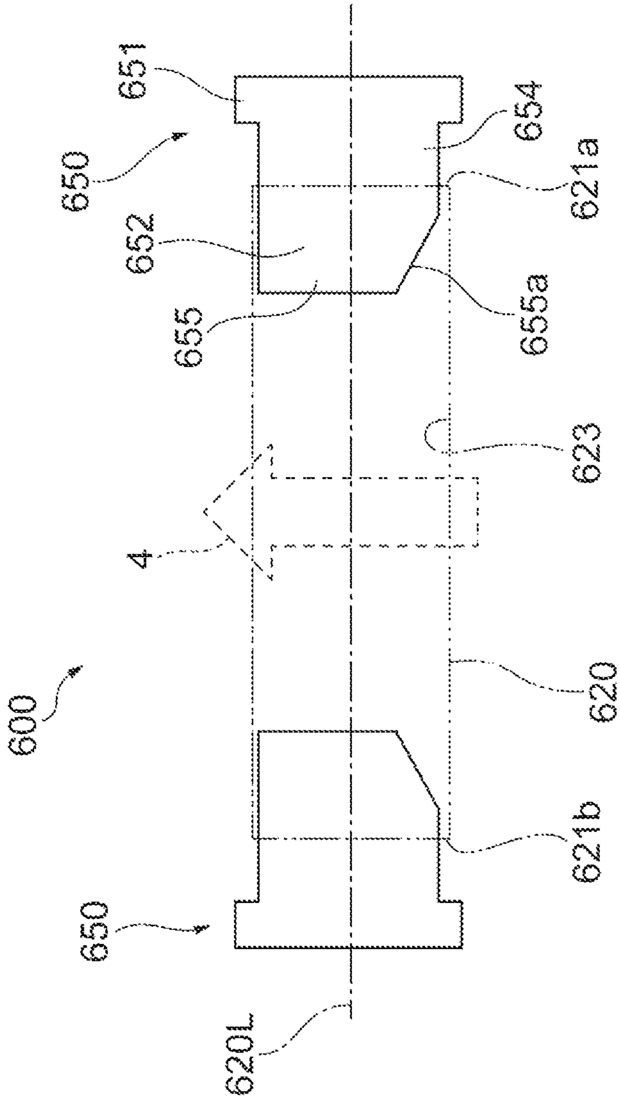
FIG. 16 is a schematic cross-sectional view of an example fixing device, illustrated in an example operational state.
Figure 18:
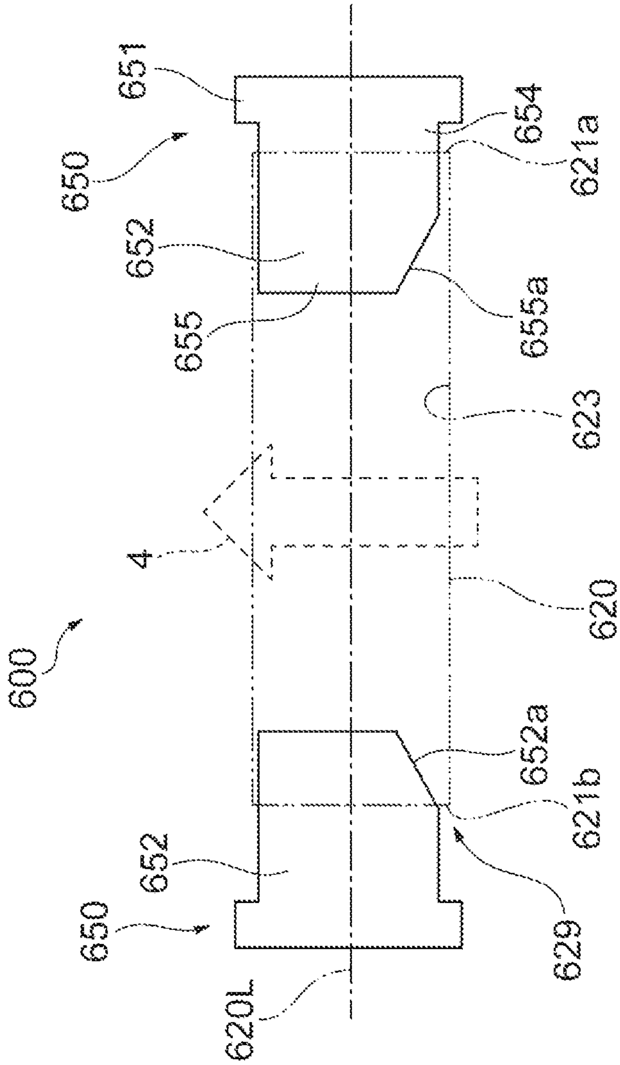
FIG. 18 is a schematic cross-sectional view of the fixing device of FIG. 16, illustrated in another example operational state.

FIGS. 16 and 18 illustrate another example fixing device 600 as viewed from a direction orthogonal to a conveyance direction 4 of the sheet 3 and to a rotational axis 620L direction of a heating belt 620, and shown without any drive roller. According to examples, the fixing device 600 may include a driving roller 93 similarly to the fixing device 90 illustrated in FIG. 2.

The example fixing device 600 includes the heating belt 620 and a bushing 650. The heating belt 620 may have a similar configuration as that of the heating belt 91 illustrated in FIG. 2. Namely, the heating belt 620 is a belt that has a tubular shape and is rotatable around a rotational axis 620L thereof, and extends in a longitudinal direction that is the rotational axis 620L direction. For example, a heat source and a plate are disposed inside the heating belt 620. The heating belt 620 is driven to rotate by the drive roller.

The bushings 650 are disposed at opposite ends of the heating belt 620. The bushing 650 includes a shoulder 651 and a stem 652. The shoulder 651 is disposed adjacent to an edge 621 in the longitudinal direction of the heating belt 620. The shoulder 651 may have, for example, a plate shape extending substantially orthogonally to the longitudinal axis of the heating belt 620. The shoulder 651 has a wall surface 651*a* separated from the edge 621 of the heating belt 620. The distance between the shoulders 651 of the bushings 650 is greater than the length of the heating belt 620. For this reason, the heating belt 620 is displaceable in the longitudinal direction relative to the bushings 650.

Figure 17:
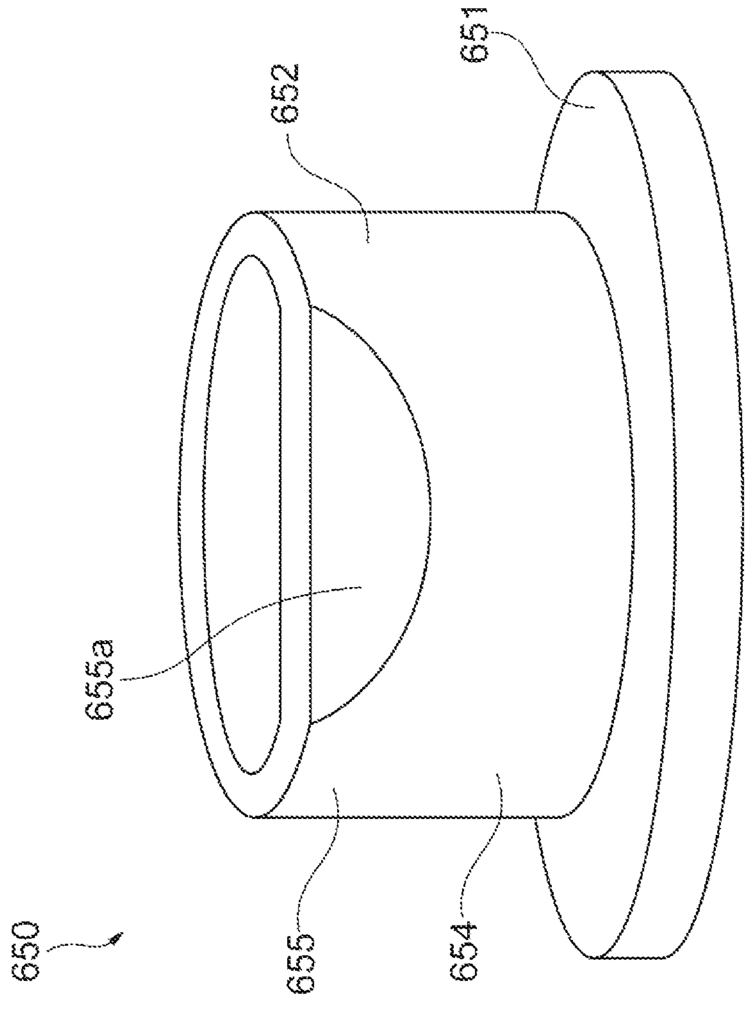
FIG. 17 is a schematic perspective view of a bushing of the example fixing device illustrated in FIG. 16.

The stem 652 protrudes from the shoulder 651 toward a heating belt 620, and to the inside of the heating belt 620 to support the heating belt 620. The stem 652 has a substantially cylindrical shape. Namely, as illustrated in FIG. 17, the stem 652 includes a cylindrical portion 654 and an inclined portion (or truncated portion) 655. The cylindrical portion 654 extends from the shoulder 651 to the heating belt 620 so as to be in contact with an inner surface 623 of the heating belt 620. The cylindrical portion 654 has a substantially cylindrical shape and is adjacent to the shoulder 651. The inclined portion 655 is a portion in the stem 652 that extends from the cylindrical portion 654. An inclined surface 655*a* is formed in an outer peripheral surface of the inclined portion 655. The inclined surface 655*a* is inclined inwardly in a radial direction from an end adjacent the cylindrical portion 654 toward a distal end. Namely, the inclined portion 655 forms the inclined surface 655*a* that extends away from the inner surface 623 of the heating belt 620 toward the inside of the heating belt 620 in the longitudinal direction. In addition, the inclined surface 655*a* is formed at least on the upstream side of the bushing 650 in the conveyance direction, in the outer peripheral surface of the inclined portion 655. In a pair of the bushings 650, the distance from a distal end of the cylindrical portion 654 of one bushing 650 (first bushing) to a proximal end of the cylindrical portion 654 of the other bushing 650 (second bushing) may be longer than the length of the heating belt 620. Namely, when one end of the heating belt 620 is at the position of the distal end of the cylindrical portion 654 of the one bushing 650, the opposite end of the heating belt 620 does not reach the shoulder 651 of the other bushing 650. In addition, in the pair of bushings 650, the distance between the cylindrical portions 654 of the bushings 650 may be shorter than the length of the heating belt 620.

When the heating belt 620 moves in the longitudinal direction, an edge 621*a* (first end portion) on a movement direction side in the heating belt 620 (e.g., the edge 621*a* corresponding to the direction of the longitudinal movement of the heating belt 620), slides on an outer peripheral surface of the cylindrical portion 654 of the stem 652 toward the shoulder 651. Meanwhile, an edge 621*b* (second end portion) located opposite to the movement direction in the heating belt 620 slides on the outer peripheral surface of the cylindrical portion 654 of the stem 652 toward the inclined portion 655. When the edge 621 moves to the position of the inclined portion 655, a gap 629 is formed on the upstream side of the conveyance direction in the conveyance path 4, between the inner surface 623 of the heating belt 620 and the stem 652 on an edge 621*b* side. In this state, since the edge 621*a* on the movement direction side is supported on the cylindrical portion 654, the force to press the heating belt 620 toward the upstream side of the conveyance direction is greater on a side of the edge 621*a* than on a side of the edge 621*b*. Namely, relatively, the inner surface 623 of the edge 621*a* on the movement direction side in the heating belt 620 is pressed by the stem 652 of the bushing 650. As described above, the force toward the upstream side is applied to the edge 621*a* on the movement direction side in the heating belt 620, which in turn changes the alignment of the heating belt 620 relative to the drive roller. Consequently, the heating belt 620 moves in a direction away from the bushing 650, and the posture (or alignment of the heating belt 320 is thereby corrected.

In the fixing device 600, the heating belt 620 is displaceable in the longitudinal direction away from the shoulder 651. As described above, in one example, when the heating belt 620 moves toward the shoulder 651, since the gap between the edge 621 of the heating belt 620 and the shoulder 651 is maintained, the shoulder 651 is prevented from causing damage to the edge 621*a* of the heating belt 620.

Figure 19:
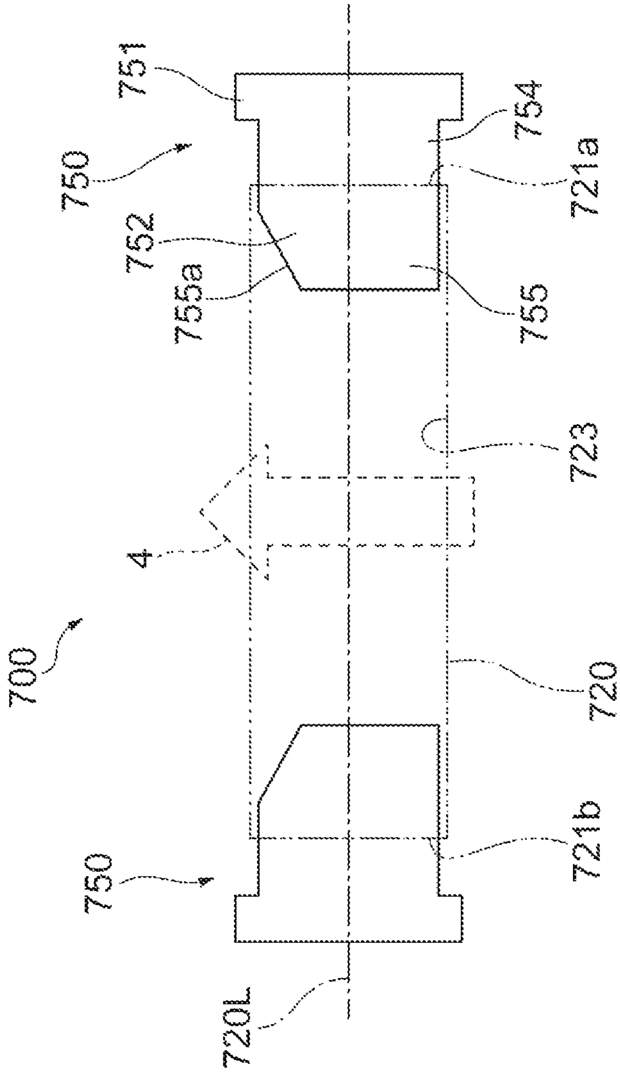
FIG. 19 is a schematic cross-sectional view of an example fixing device, illustrated in an example operational state.
Figure 20:
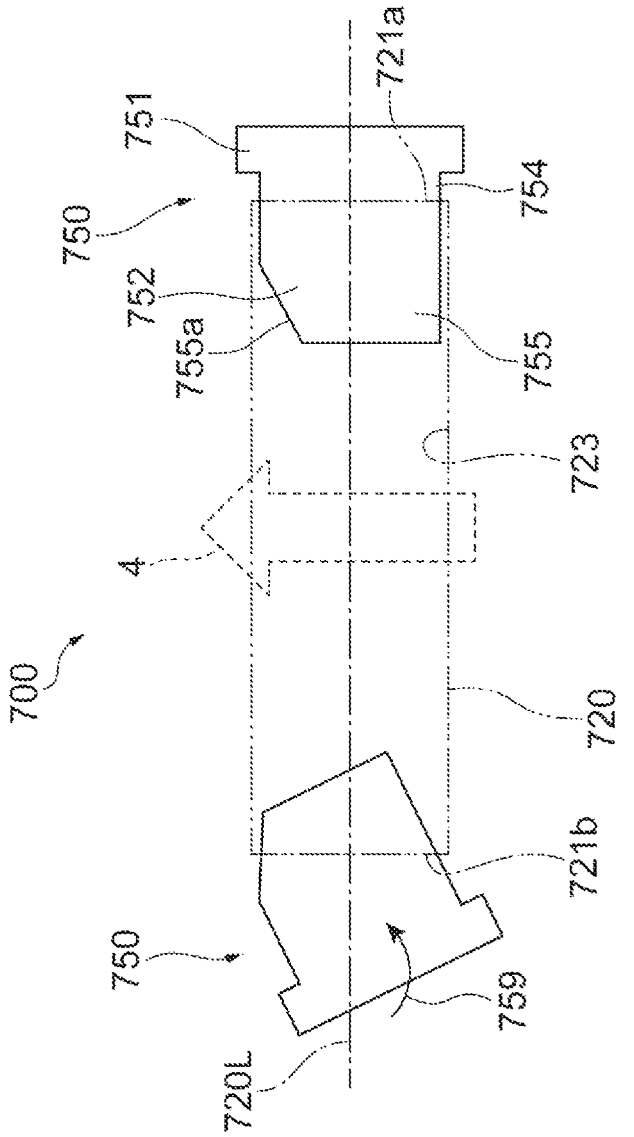
FIG. 20 is a schematic cross-sectional view of the fixing device of FIG. 19, illustrated in another example operational state.

FIGS. 19 and 20 illustrate another example fixing device 700 as viewed from a direction orthogonal to a conveyance direction 4 of the sheet 3 and to a rotational axis 720L direction of a heating belt 720, shown without any drive roller. According to examples, the fixing device 700 may include a driving roller 93 similarly to the fixing device 90 illustrated in FIG. 2.

The example fixing device 700 includes the heating belt 720 and a bushing 750. The heating belt 720 may have a similar configuration as that of the heating belt 91 illustrated in FIG. 2. Namely, the heating belt 720 is a belt that has a tubular shape and is rotatable around a rotational axis 720L thereof, and extends in a longitudinal direction that is the rotational axis 720L direction. For example, a heat source and a plate are disposed inside the heating belt 720. The heating belt 720 is driven to rotate by the drive roller.

The bushings 750 are disposed at opposite ends of the heating belt 720. The bushing 750 includes a shoulder 751 and a stem 752. The shoulder 751 is disposed adjacent to an edge 721 in the longitudinal direction of the heating belt 720. The shoulder 751 may have, for example, a plate shape extending substantially orthogonally to the longitudinal axis of the heating belt 720. The shoulder 751 has a wall surface 751*a* separated from the edge 721 of the heating belt 720. The distance between the shoulders 751 of the bushings 750 is greater than the longitudinal length of the heating belt 720. For this reason, the heating belt 720 is displaceable in the longitudinal direction relative to the bushings 750. In addition, a distance between the cylindrical portions 754 of the bushings 750 may be shorter than the length of the heating belt 720.

The stem 752 protrudes from the shoulder 751 toward a heating belt 720, and to the inside of the heating belt 720 to support the heating belt 720. The stem 752 has a substantially cylindrical shape. Namely, the stem 752 includes the cylindrical portion 754 and an inclined portion (truncated portion) 755. The cylindrical portion 754 extends from the shoulder 751 to the heating belt 720 so as to be in contact with an inner surface 723 of the heating belt 720. The cylindrical portion 754 has a substantially cylindrical shape and is adjacent to the shoulder 751. The inclined portion 755 is a portion in the stem 752 that extends from the cylindrical portion 754. An inclined surface 755*a* is formed in an outer peripheral surface of the inclined portion 755. The inclined surface 755*a* is inclined inwardly in a radial direction from an end adjacent the cylindrical portion 754 toward a distal end. Namely, the inclined portion 755 forms the inclined surface 755*a* that extends away from the inner surface 723 of the heating belt 720 toward the inside of the heating belt 720 in the longitudinal direction. In the pair of bushings 750, the distance from the distal end of the cylindrical portion 754 of a first bushing 750 to a proximal end of the cylindrical portion 754 of a second bushing 750 may be longer than the length of the heating belt 720. Namely, when one end of the heating belt 720 is at the position of the distal end of the cylindrical portion 754 of the first bushing 750, the opposite end of the heating belt 720 does not reach the shoulder 751 of the second bushing 750.

In addition, the inclined surface 755*a* is formed on the downstream side of the bushing 750 in the conveyance direction in the outer peripheral surface of the inclined portion 755. In one example, the bushing 750 includes a biasing member 759. The biasing member 759 may be, for example, a torsion coil spring or the like. In FIG. 20, in order to facilitate understanding of the function, the biasing member 759 is indicated by an arcuate-shaped arrow. The biasing member 759 biases the bushing 750 such that the bushing 750 is rotated. For example, in the longitudinal direction of the heating belt 720, the biasing member 759 biases the bushing 750 in a direction where the distal end of the bushing 750 moves toward the conveyance direction in the conveyance path 4. The biasing member 759 is not limited to a torsion coil spring or the like, and may be, for example, a rotation mechanism including a biasing member such as a spring.

When the heating belt 720 moves in the longitudinal direction, an edge 721*a* on a movement direction side in the heating belt 720 (e.g., the edge 721*a* corresponding to the direction of the longitudinal movement of the heating belt 720), slides on an outer peripheral surface of the cylindrical portion 754 of the stem 752 toward the shoulder 751. Meanwhile, an edge 721*b* located opposite to the movement direction in the heating belt 720 slides on the outer peripheral surface of the cylindrical portion 754 of the stem 752 toward the inclined portion 755. When the edge 721*b* moves to the position of the inclined portion 755, a gap is formed on the downstream side of the conveyance direction in the conveyance path 4, between the inner surface 723 of the heating belt 720 and the stem 752 on an edge 721*b* side. Accordingly, as illustrated in FIG. 20, the bushing 750 on the edge 721*b* side rotates due to the action of the biasing member 759. Then, a gap 728 is formed between an upstream peripheral surface of the stem 752 on the edge 721*b* side and the inner surface 723 of the heating belt 720. In this state, since the edge 721*a* on the movement direction side is supported on the cylindrical portion 754, the force to press the heating belt 720 toward the upstream side of the conveyance direction is greater on a side of the edge 721*a* than on a side of the edge 721*b*. Namely, relatively, the inner surface 723 of the edge 721*a* on the movement direction side in the heating belt 720 is pressed by the stem 752 of the bushing 750. As described above, the force toward the upstream side is applied to the edge 721*a* on the movement direction side in the heating belt 720, which in turn changes the alignment of the heating belt 720 relative to the drive roller. Consequently, the heating belt 720 moves in a direction away from the bushing 750, and the posture (or alignment) of the heating belt 720 is thereby corrected.

In the fixing device 700, the heating belt 720 is displaceable in the longitudinal direction away from the shoulder 751. As described above, in one example, when the heating belt 720 moves toward the shoulder 751, since the gap between the edge 721 of the heating belt 720 and the shoulder 751 is maintained, the shoulder 751 is prevented from causing damage to the edge 721*a* of the heating belt 720.

Figure 21:
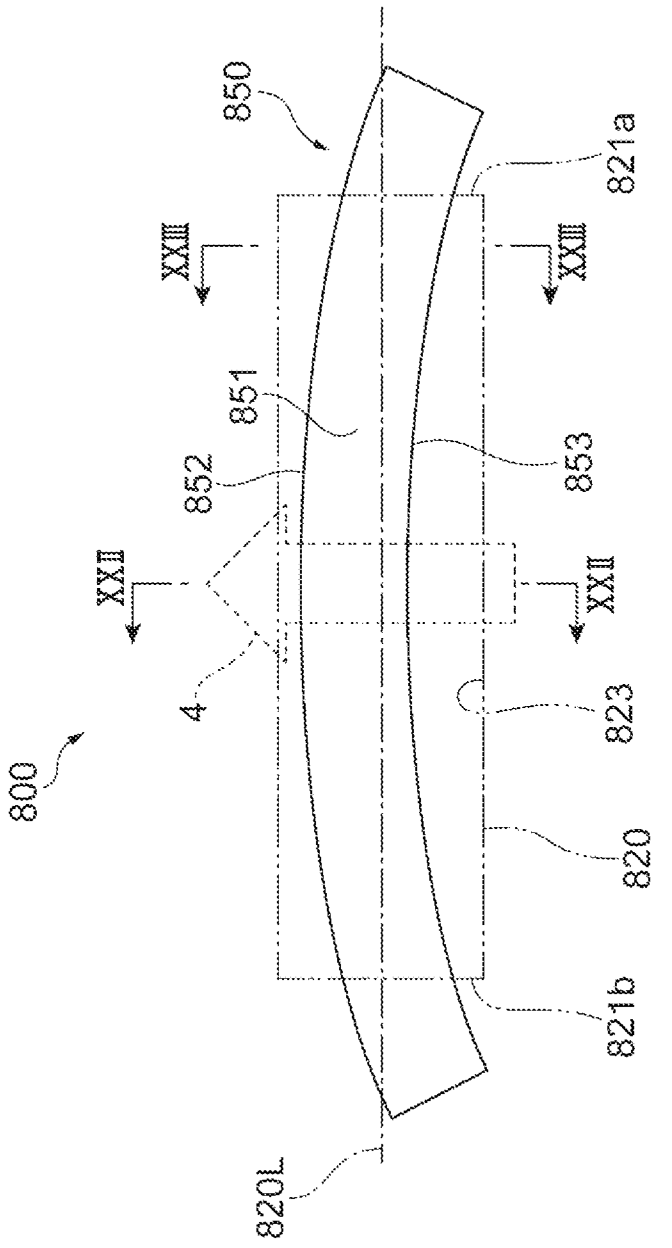
FIG. 21 is a schematic cross-sectional view of another example fixing device, illustrated in an example operational state.
Figure 24:
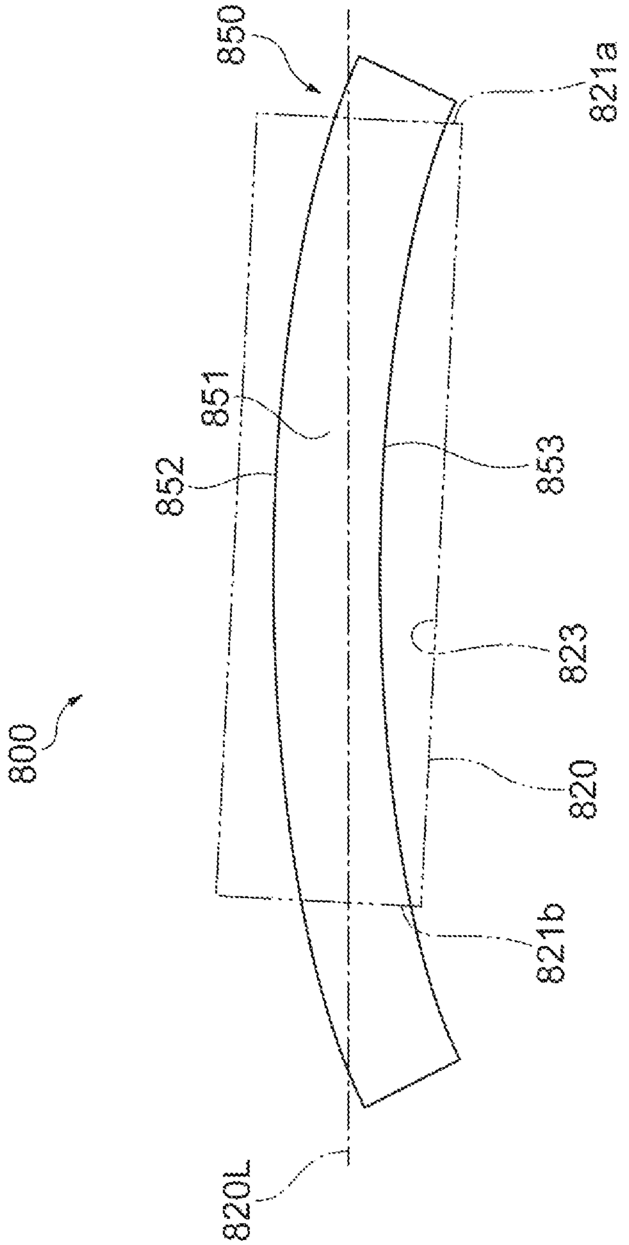
FIG. 24 is a cross-sectional schematic view of the example fixing device of FIG. 21, illustrated in another example operational state.

FIGS. 21 and 24 illustrate another example fixing device 800 as viewed from a direction orthogonal to a conveyance direction 4 of the sheet 3 and to a rotational axis 820L direction of a heating belt 820, shown without the drive roller 840.

The example fixing device 800 includes a belt having a tubular shape and extending in a longitudinal direction, the belt having a first end in the longitudinal direction and a second end in the longitudinal direction, which is opposite to the first end in the longitudinal direction, a drive roller rotating belt to convey a print medium between the drive roller and the belt in a conveyance path, and a support device extending through the belt from the first end to the second end in the longitudinal direction. The support device has a first end in the longitudinal direction, which is adjacent to the first end of the belt, and a second end in the longitudinal direction, which is adjacent to the second end of the belt. The first end and the second end of the support device, each extends outwardly from the belt toward a rearward direction opposite to a conveyance direction 4 of the print medium.

The example fixing device 800 includes the heating belt 820, a drive roller 840, and a plate (support device) 850. The heating belt 820 may have a similar configuration as that of the heating belt 91 illustrated in FIG. 2. Namely, the heating belt 820 is a belt that has a tubular shape and is rotatable around a rotational axis 820L thereof, and extends in the longitudinal direction that is the rotational axis 820L direction. For example, a heat source and the plate 850 are disposed inside the heating belt 820.

Figure 22:
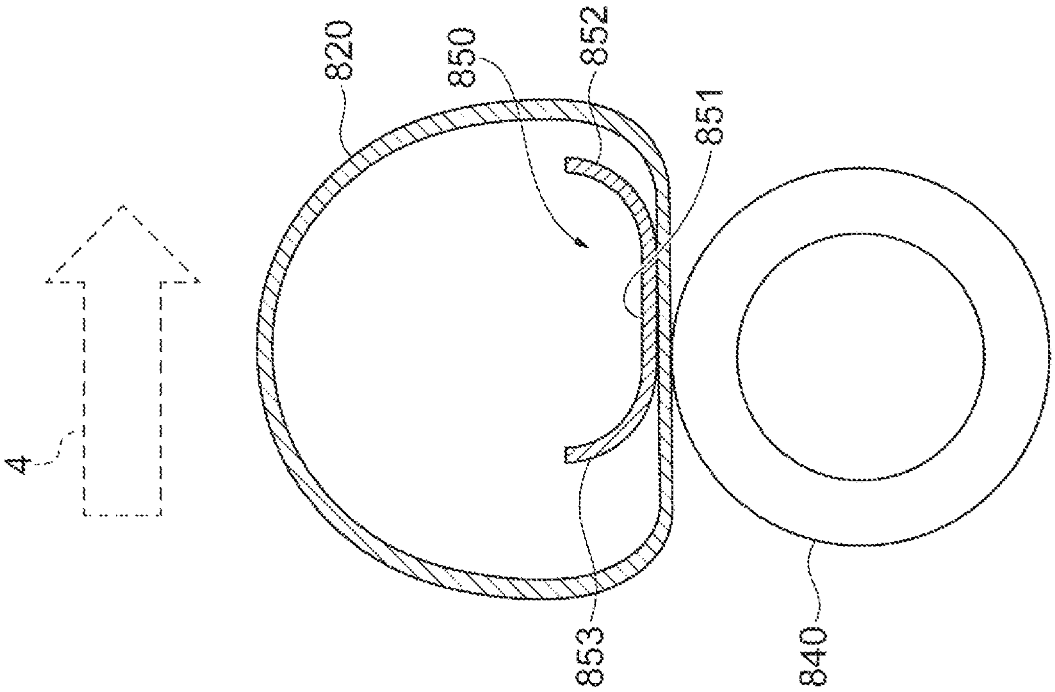
FIG. 22 is a schematic cross-sectional view of the fixing device illustrated in FIG. 21, taken along line XXII-XXII.
Figure 23:
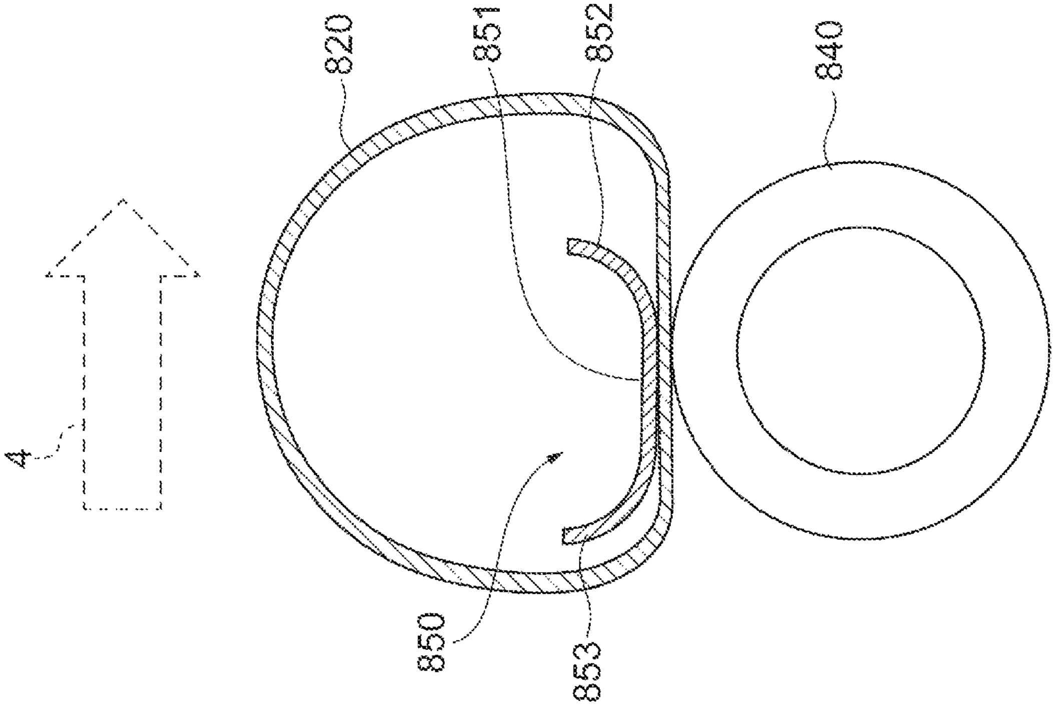
FIG. 23 is a schematic cross-sectional view of the fixing device illustrated in FIG. 21, taken along line XXIII-XXIII.

With reference to FIGS. 22 and 23, the drive roller 840 is disposed adjacent to the heating belt 820 so as to be parallel to the heating belt 820. The drive roller 840 is rotated around the rotational axis thereof by a motor or the like, and drives the heating belt 820 to rotate. The sheet is conveyed through a nip region to be formed between the drive roller 840 and the heating belt 820 along the conveyance path 4.

The plate 850 extends through the heating belt 820 from one end 821*a* in the longitudinal direction to the other end 821*b*. Namely, the plate 850 is disposed inside the heating belt 820 and both ends in the longitudinal direction of the plate 850 extend outside the heating belt 820. As illustrated in FIG. 22, the plate 850 has a substantially U-shaped cross section. Namely, the plate 850 includes a central portion 851, a downstream portion 852, and an upstream portion 853, relative to the conveyance direction 4. The central portion 851 has a surface oriented toward the drive roller 840 and is formed flat. The downstream portion 852 is a portion downstream of the central portion 851 in the conveyance direction of the conveyance path 4. The downstream portion 852 is curved away from the drive roller 840, starting from a downstream end portion of the central portion 851. The upstream portion 853 is a portion upstream of the central portion 851 in the conveyance direction of the conveyance path 4. The upstream portion 853 is curved in a direction away from the drive roller 840, starting from an upstream end portion of the central portion 851.

As illustrated in FIG. 21, the plate 850 has a first end 856*a* adjacent to the end 821*a* of the heating belt 820, and a second end 856*b* adjacent to the end 821*b*. The first end 856*a* and the second end 856*b* of the plate 850 extend outwardly from the heating belt 820 so as to be curved toward the upstream side of the conveyance direction. The first end 856*a* and the second end 856*b* of the plate 850 extend outward from the heating belt 820 toward the upstream side of the conveyance direction and may be formed linearly, for example. In the illustrated example, the plate 850 is curved in an arcuate shape from the first end 856*a* to the second end 856*b*. For example, the radius of curvature of the plate 850 that is curved in an arcuate shape may be from 1,000 mm to 200,000 mm. For this reason, the center in the longitudinal direction of the heating belt 820 is interposed between an upstream side of the central portion 851 of the plate 850 and the drive roller 840, with reference to FIG. 22. In addition, end portions in the longitudinal direction of the heating belt 820 are interposed between a downstream side of the central portion 851 of the plate 850 and the drive roller 840, with reference to FIG. 23.

Figure 25:
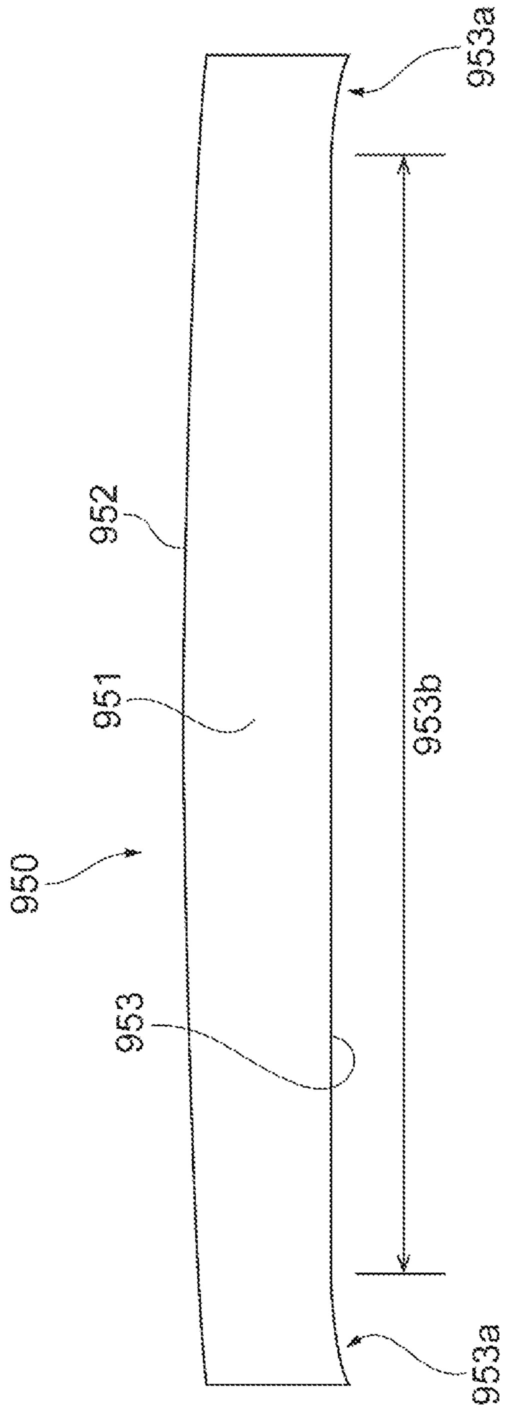
FIG. 25 is a schematic plan view of a plate for the fixing device illustrated in FIG. 21, according to another example.

In the plate, at least both end portions may be curved or inclined toward the upstream side. FIG. 25 illustrates a plate 950 according to another example. The fixing device 800 may include the plate 950 instead of the plate 850. The plate 950 has a central portion 951, a downstream portion 952, and an upstream portion 953 similar to the central portion 851, the downstream portion 852, and the upstream portion 853 of the plate 850, and has a substantially U-shaped cross section. In addition, the plate 950 includes a straight portion (or substantially linear portion) 953*b* that is to be located at the center thereof in the longitudinal direction and is to be formed substantially straight along the longitudinal direction, and curved portions 953*a* that are to be formed at both ends of the substantially linear portion 953*b*. The curved portion 953*a* extends from the substantially linear portion 953*b* and is curved toward the upstream side of the conveyance direction, starting from the substantially linear portion 953*b*. According to examples, in a case where the curved portion 953*a* is curved in an arcuate shape, the radius of curvature of the curved portion 953*a* may be from 10 mm to 1,000 mm. In some examples, the longitudinal length of the heating belt may be the same as the longitudinal length of the substantially linear portion 953*b*. For this reason, the curved portions 953*a* of the plate 950 extend outwardly from the heating belt so as to be curved toward the upstream side of the conveyance direction. Both ends (curved portions) of the plate 950 may extend outwardly from the heating belt toward the upstream side of the conveyance direction and may be formed substantially linearly, for example.

In the fixing device 800 described above, when the heating belt 820 moves in the longitudinal direction, an inner surface 823 of the end 821*a* in a movement direction side in the heating belt 820 (e.g., the end 821*a* corresponding to the direction of the longitudinal movement of the heating belt 820), is relatively pressed toward the upstream side by the first end 856*a* of the plate 850, the first end 856*a* being curved toward the upstream side of the conveyance direction. As described above, the force toward the upstream side is applied to the end portion on the movement direction side in the heating belt 820, and thus the alignment of the heating belt 820 relative to the drive roller 840 is changed. Accordingly, the posture of the heating belt 820 is corrected, and thus the heating belt 820 moves opposite to the movement direction. In the fixing device 800, the shoulder adjacent to the heating belt 820 is not provided and stress is prevented from being concentrated on the inner surface 823 of the heating belt 820, and thus damage to the heating belt 820 is reduced.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. A fixing device comprising:

a belt having a tubular shape and extending in a longitudinal direction, the belt having a longitudinal end forming an edge of the belt;

a drive roller to rotate the belt, to convey a print medium between the drive roller and the belt;

a bushing located at the longitudinal end of the belt, the bushing including a shoulder adjacent to the longitudinal end of the belt and a stem extending from the shoulder to an inside of the belt to support the belt; and a guide wall adjacent to the bushing to guide the bushing to move along an arcuate path in a direction opposite to a conveyance direction of the print medium, when the belt moves toward the bushing.

2. The fixing device according to claim 1, an axial direction of the stem of the bushing to coincide with an axial direction of the belt when the bushing moves along the guide wall in the direction opposite to the conveyance direction.

3. The fixing device according to claim 1, wherein the bushing has an end surface that is in contact with the guide wall, and wherein the end surface is curved to guide the bushing along the arcuate path when the bushing is moved by the belt.

4. The fixing device according to claim 1, wherein the guide wall has a surface that is in contact with the bushing, and wherein the surface of the guide wall is curved to guide the bushing to move along the arcuate path when the bushing is moved by the endless belt.

5. A fixing device comprising:

a belt having a tubular shape and extending in a longitudinal direction, the belt having a longitudinal end forming an edge of the belt;

a drive roller to rotate the belt, to convey a print medium between the drive roller and the belt; and a bushing located at the longitudinal end of the belt, the bushing including a shoulder separated from the longitudinal end of the belt and a stem extending from the shoulder to an inside of the belt to support the belt, wherein the belt is displaceable in the longitudinal direction away from the shoulder of the bushing so as to prevent contact between the edge of the belt and the shoulder, wherein the stem includes a cylindrical portion extending from the shoulder to the belt so as to be in contact with an inner peripheral surface of the belt, and an inclined portion extending from the cylindrical portion, and wherein the inclined portion has an inclined surface separated from the inner peripheral surface of the belt.

6. The fixing device according to claim 5, wherein a longitudinal end portion of the belt includes a first end portion, wherein the fixing device includes a second end portion opposite to the first end portion, wherein the bushing is a first bushing, wherein the fixing device includes a second bushing disposed in the second end portion.

7. The fixing device according to claim 6, wherein the inclined surface is formed on an upstream side in a conveyance direction of the print medium.

8. The fixing device according to claim 6, wherein the inclined surface is located on a downstream side of the bushing in a conveyance direction of the print medium, and wherein the fixing device includes a biasing member to rotate the second bushing to an angle that causes the inclined surface of the second bushing to contact the inner peripheral surface of the belt, in order to move the belt away from the shoulder of the first bushing when the belt moves toward the shoulder of the first bushing.

9. A fixing device comprising:

a belt having a tubular shape and extending in a longitudinal direction, the belt having a first end in the longitudinal direction and a second end in the longitudinal direction, opposite to the first end;

a drive roller to rotate the belt, to convey a print medium between the drive roller and the belt; and a support device extending inside of the belt from the first end to the second end in the longitudinal direction, wherein the support device has a first end in the longitudinal direction, which is adjacent to the first end of the belt, and a second end in the longitudinal direction, which is adjacent to the second end of the belt, wherein the first end of the support device extends outwardly from the belt toward a rearward direction that is opposite to a conveyance direction of the print medium, and wherein the second end of the support device extends outwardly from the belt toward the rearward direction.

* * * * *